(12) United States Patent
Batchelder et al.

(10) Patent No.: US 11,213,998 B2
(45) Date of Patent: Jan. 4, 2022

(54) LIQUEFIER ASSEMBLIES FOR ADDITIVE MANUFACTURING SYSTEMS, AND METHODS OF USE THEREOF

(71) Applicant: Stratasys, Inc., Eden Prairie, MN (US)

(72) Inventors: J. Samuel Batchelder, Somers, NY (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 447 days.

(21) Appl. No.: 15/514,742

(22) PCT Filed: Sep. 28, 2015

(86) PCT No.: PCT/US2015/052683
§ 371 (c)(1),
(2) Date: Mar. 27, 2017

(87) PCT Pub. No.: WO2016/049642
PCT Pub. Date: Mar. 31, 2016

(65) Prior Publication Data
US 2017/0217089 A1 Aug. 3, 2017

Related U.S. Application Data

(60) Provisional application No. 62/056,186, filed on Sep. 26, 2014, provisional application No. 62/056,200, filed on Sep. 26, 2014.

(51) Int. Cl.
*B29C 64/118* (2017.01)
*B33Y 30/00* (2015.01)
(Continued)

(52) U.S. Cl.
CPC .......... *B29C 64/118* (2017.08); *B29C 64/106* (2017.08); *B29C 64/20* (2017.08);
(Continued)

(58) Field of Classification Search
CPC ... B29C 64/118; B29C 67/00; B29C 67/0007; B33Y 10/00
See application file for complete search history.

(56) References Cited

U.S. PATENT DOCUMENTS

| 5,121,329 A | 6/1992 | Crump |
| 5,340,433 A | 8/1994 | Crump |

(Continued)

FOREIGN PATENT DOCUMENTS

| DE | 4422146 A1 | 1/1996 |
| WO | 97/48557 | * 6/1997 |

(Continued)

OTHER PUBLICATIONS

Chinese Office Action dated Dec. 20, 2018 for corresponding Chinese Application No. 201580051944.4, filed May 27, 2017.

(Continued)

*Primary Examiner* — Matthew J Daniels
*Assistant Examiner* — Shibin Liang
(74) *Attorney, Agent, or Firm* — Peter J. Ims; Westman, Champlin & Koehler, P.A.

(57) ABSTRACT

A liquefier assembly for use in an additive manufacturing system to print three-dimensional parts. In one aspect, the liquefier assembly includes a liquefier that is transversely compressible, and having an inlet end configured to receive a consumable material in a solid or molten state and an outlet end, a nozzle at the outlet end, and an actuator mechanism configured to transversely compress and expand the liquefier in a controlled manner In another aspect, the liquefier assembly is self heating.

7 Claims, 22 Drawing Sheets

(51) Int. Cl.

| | | |
|---|---|---|
| *B29C 64/386* | (2017.01) | |
| *B33Y 40/00* | (2020.01) | |
| *B29C 64/295* | (2017.01) | |
| *B29C 64/321* | (2017.01) | |
| *B29C 64/20* | (2017.01) | |
| *B29C 64/106* | (2017.01) | |
| *B33Y 10/00* | (2015.01) | |
| *B33Y 50/02* | (2015.01) | |
| *B29K 105/00* | (2006.01) | |

(52) U.S. Cl.
CPC .......... *B29C 64/295* (2017.08); *B29C 64/321* (2017.08); *B29C 64/386* (2017.08); *B33Y 10/00* (2014.12); *B33Y 30/00* (2014.12); *B33Y 40/00* (2014.12); *B33Y 50/02* (2014.12); *B29K 2105/0067* (2013.01)

(56) References Cited

U.S. PATENT DOCUMENTS

| | | |
|---|---|---|
| 6,004,124 A | 12/1999 | Swanson et al. |
| 6,054,077 A | 4/2000 | Comb et al. |
| 6,164,850 A | 12/2000 | Speakman |
| 6,402,403 B1 | 6/2002 | Speakman |
| 6,547,995 B1 | 4/2003 | Comb |
| 6,722,872 B1 | 4/2004 | Swanson et al. |
| 7,127,309 B2 | 10/2006 | Dunn et al. |
| 7,281,785 B2 * | 10/2007 | Palifka ............... B41J 2/175 347/85 |
| 7,374,712 B2 | 5/2008 | Swanson et al. |
| 7,384,255 B2 | 6/2008 | LaBossiere et al. |
| 7,604,470 B2 | 10/2009 | LaBossiere et al. |
| 7,891,964 B2 | 2/2011 | Skubic et al. |
| 7,896,209 B2 | 3/2011 | Batchelder et al. |
| 7,897,074 B2 | 3/2011 | Batchelder et al. |
| 7,938,356 B2 | 5/2011 | Taatjes et al. |
| 8,153,182 B2 | 4/2012 | Comb et al. |
| 8,221,669 B2 * | 7/2012 | Batchelder ............ B29C 48/914 264/308 |
| 8,236,227 B2 | 8/2012 | Batchelder et al. |
| 8,403,658 B2 | 3/2013 | Swanson |
| 8,439,665 B2 | 5/2013 | Batchelder et al. |
| 8,647,098 B2 | 2/2014 | Swanson et al. |
| 8,647,102 B2 | 2/2014 | Swanson et al. |
| 9,168,698 B2 * | 10/2015 | Kemperle ............ B33Y 30/00 |
| 9,527,240 B2 | 12/2016 | Batchelder |
| 9,796,140 B2 * | 10/2017 | Page ................ B29C 70/30 |
| 10,131,131 B2 | 11/2018 | Batchelder et al. |
| 2013/0078073 A1 | 3/2013 | Comb et al. |
| 2013/0161432 A1 | 6/2013 | Mannella et al. |
| 2013/0161442 A1 | 6/2013 | Mannella et al. |
| 2013/0241102 A1 | 9/2013 | Rodgers et al. |
| 2013/0333798 A1 | 12/2013 | Bosveld et al. |
| 2014/0048969 A1 | 2/2014 | Swanson et al. |
| 2014/0158802 A1 | 6/2014 | Batchelder et al. |
| 2014/0159273 A1 | 6/2014 | Koop et al. |
| 2014/0159284 A1 | 6/2014 | Leavitt |
| 2014/0265040 A1 | 9/2014 | Batchelder |
| 2015/0097053 A1 | 4/2015 | Batchelder et al. |
| 2015/0183159 A1 * | 7/2015 | Duty ................ B29C 67/0055 428/195.1 |
| 2016/0001461 A1 | 1/2016 | Gardiner et al. |
| 2017/0157826 A1 * | 6/2017 | Hishiki ............... B29C 31/042 |

FOREIGN PATENT DOCUMENTS

| | | | |
|---|---|---|---|
| WO | 9748557 A2 | 12/1997 | |
| WO | WO-9748557 A2 * | 12/1997 | ............... B41J 2/01 |
| WO | 2012088253 A1 | 6/2012 | |
| WO | 2014127426 A1 | 8/2014 | |
| WO | 97/48557 A2 | 12/2014 | |

OTHER PUBLICATIONS

Chinese Office Action dated May 28, 2018 for corresponding Chinese Application No. 201580051944.4, filed Mar. 27, 2017.
Communication pursuant to Article 94(3) EPC from EP 15 778 514.8, dated Jun. 21, 2019, 4 Pages.
International Search Report and Written Opinion dated Jul. 12, 2015 for corresponding International Application No. PCT/US2015/052683, filed Sep. 28, 2015.
International Search Report and Written Opinion dated Feb. 29, 2016, for corresponding International Application No. PCT/US2015/052681, filed Sep. 28, 2015.
Second Office Action, for Chinese Patent Application No. 201580051944.4, dated Dec. 20, 2018, 4 pages.
Decision to Grant Form, for European Patent Application No. 15778514.8, dated Jun. 5, 2020, 2 pages.
Notice of Allowance, for Chinese Patent Application No. 201580051944.4, dated Jul. 1, 2019, 4 pages.
USPTO-issued prosecution for U.S. Appl. No. 15/514,740, filed Mar. 27, 2017, including: Notice of Allowance and Fees Due (PTOL-85) and Examiner initiated interview summary (PTOL-413B) dated May 7, 2020, 11 pages; Non-Final Rejection dated Jan. 16, 2020, 8 pages; and Requirement for Restriction/Election dated Jul. 12, 2019, 7 pages; 26 total pages.
Application and Drawings for U.S. Appl. No. 16/919,395, filed Jul. 2, 2020.

* cited by examiner

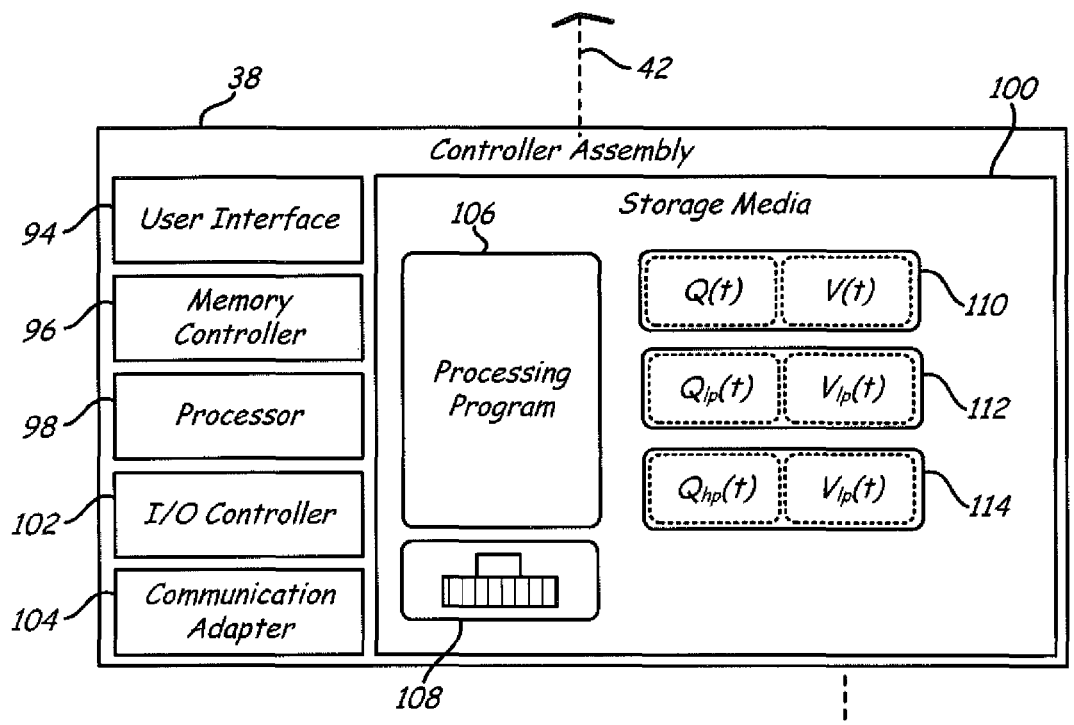
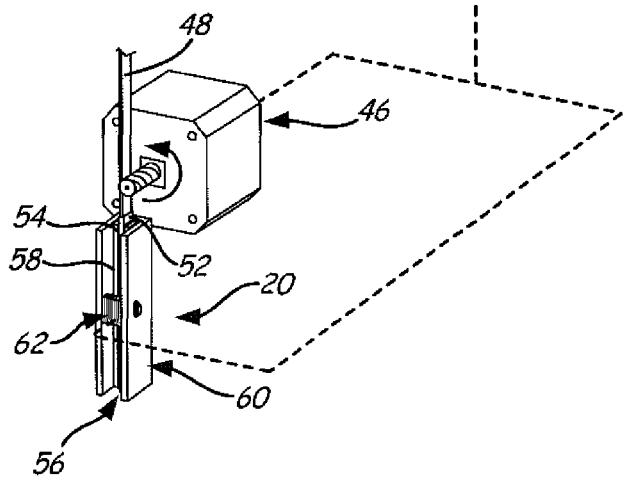
FIG. 6

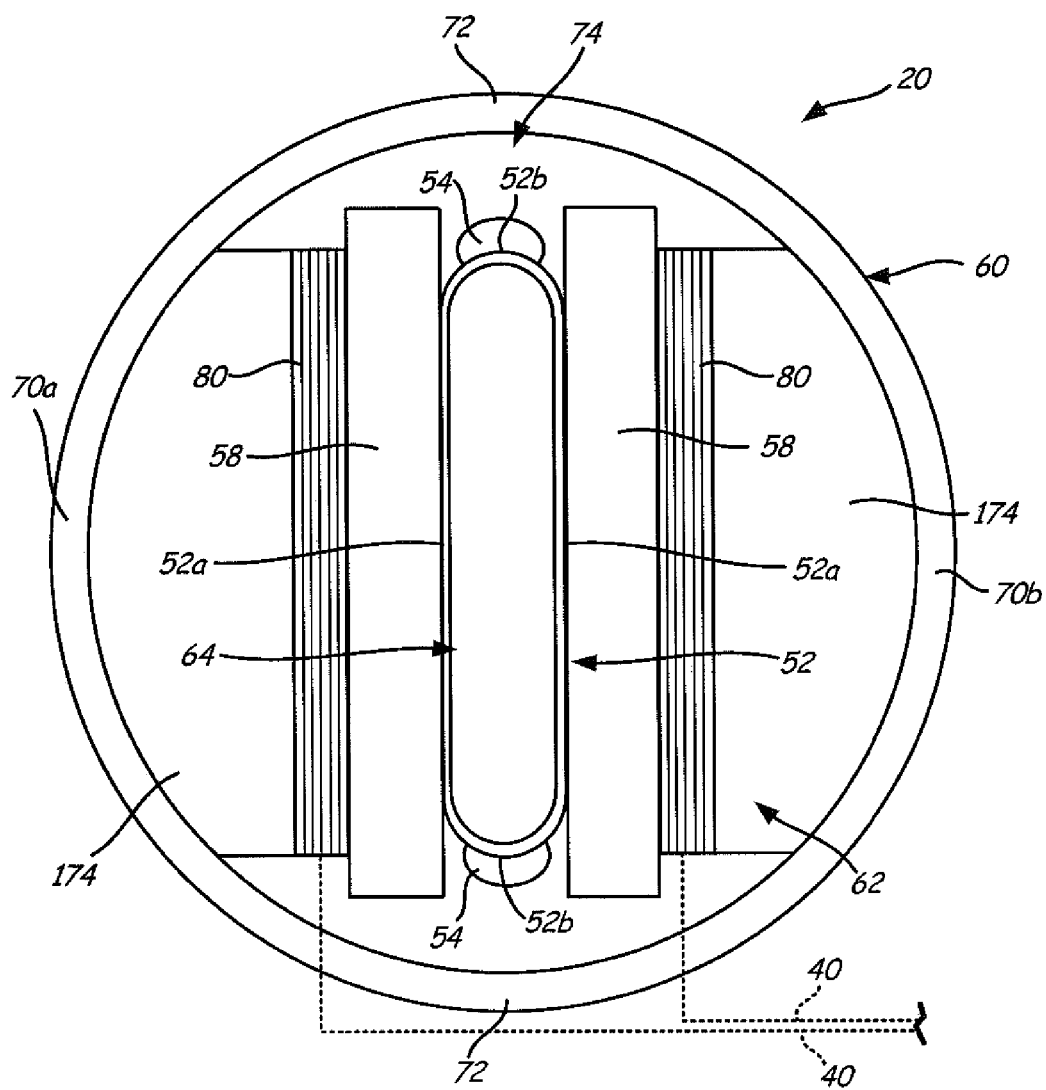
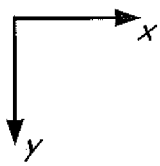
FIG. 17

LIQUEFIER ASSEMBLIES FOR ADDITIVE MANUFACTURING SYSTEMS, AND METHODS OF USE THEREOF

CROSS-REFERENCE TO RELATED APPLICATION(S)

This Application is a 371 National Stage Application of International Application No. PCT/US2015/052683, filed on Sep. 28, 2015, published as International Publication No. WO2016/049642, which claims priority to U.S. Patent Application No. 62/056,200, filed on Sep. 26, 2014 and U.S. Patent Application No. 62/056,186, filed on Sep. 26, 2014, the contents of which are incorporated by reference in their entireties.

BACKGROUND

The present disclosure relates to additive manufacturing systems for printing or otherwise producing three-dimensional (3D) parts and support structures. In particular, the present disclosure relates to liquefier assemblies for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, digital light processing (DLP), and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a liquefier assembly for use in an additive manufacturing system to print 3D parts. The liquefier assembly includes a frame having flanges, where the frame defines a channel extending along a longitudinal axis between the flanges. The liquefier assembly also includes a liquefier disposed within the channel, and having an inlet end and an outlet end offset along the longitudinal axis, and where the liquefier is transversely compressible. The liquefier assembly further includes a nozzle at the outlet end of the liquefier, and an actuator mechanism operably connected to frame, where the actuator mechanism is configured to controllably apply pressure to transversely compress the liquefier. In some embodiments, the liquefier assembly is a subcomponent of a print head having a drive mechanism, and/or a subcomponent of a removable and interchangeable consumable assembly.

Another aspect of the present disclosure is directed to an additive manufacturing system for printing 3D parts. The additive manufacturing system includes a drive mechanism, and a liquefier assembly that includes a frame, a liquefier disposed within the frame, and having an inlet end and an outlet end, a nozzle at the outlet end of the liquefier, and an actuator mechanism operably connected to the frame. The system also includes a controller assembly configured to command the drive mechanism to feed a consumable material to the inlet end of the liquefier, and to command actuator mechanism to controllably apply pressure on the frame to transversely compress the liquefier.

Another aspect of the present disclosure is directed to a method for printing a 3D part with an additive manufacturing system. The method includes feeding a filament to a liquefier retained by the additive manufacturing system with a drive mechanism retained by the additive manufacturing system, and melting the fed filament in the liquefier to produce a molten material of the filament. The method also includes extruding the molten material from a nozzle of the liquefier with a viscosity-pump action from the feeding of the filament to the liquefier, and transversely compressing the liquefier to generate an extrudate surge of the molten material from the nozzle.

Another aspect of the present disclosure is directed to an additive manufacturing system for printing three-dimensional parts, which includes a drive mechanism and a liquefier having an inlet end and an outlet end offset along a longitudinal axis, where the liquefier compositionally comprises a thermally and electrically conductive material. The system also includes a nozzle at the outlet end of the liquefier, and a controller assembly configured to operably apply an electrical current to the liquefier to heat the liquefier by resistance heating, to monitor one or more temperatures of the liquefier in real time from the resistance to the applied electrical current, and to command the drive mechanism to feed a consumable material to the inlet end of the liquefier.

Another aspect of the present disclosure is directed to a liquefier assembly for use in an additive manufacturing system to print 3D parts, which includes a liquefier disposed having an inlet end and an outlet end offset along a longitudinal axis, wherein the liquefier compositionally comprises a thermally and electrically conductive material. The liquefier assembly also includes a nozzle at the outlet end of the liquefier, a first electrode located at the inlet end of the liquefier, and one or more electrical lines connected to one or more locations of the liquefier along the longitudinal axis, where the one or more electrical lines are configured to operably receive an electrical current from a controller assembly of the additive manufacturing system to heat the liquefier by resistance heating.

Another aspect of the present disclosure is directed to a method for printing a 3D part with an additive manufacturing system. The method includes resistively heating a liquefier retained by the additive manufacturing system with an electrical current that is applied to the liquefier, and feeding a filament to a heated liquefier with a drive mechanism retained by the additive manufacturing system. The method also includes melting the fed filament in the heated liquefier to produce a molten material of the filament, and extruding the molten material from a nozzle connected to the liquefier.

DEFINITIONS

Unless otherwise specified, the following terms as used herein have the meanings provided below:

The term "operably connected", with reference to articles being operably connected to each other, refers to direct connections (physically in contact with each other) and indirect connections (connected to each other with one or more additional components, such as spacers, disposed between them).

The terms "command", "commanding", and the like, with reference to a controller assembly commanding a device (e.g., a drive mechanism, an actuator, or the like), refers to the direct and/or indirect relaying of control signals from the controller assembly to the device such that the device operates in conformance with the relayed signals. The signals may be relayed in any suitable form, such as communication signals to a microprocessor on the device, applied electrical power to operate the device, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "at least one" and "one or more of" an element are used interchangeably, and have the same meaning that includes a single element and a plurality of the elements, and may also be represented by the suffix "(s)" at the end of the element.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 6 is a schematic illustration of a controller assembly of the additive manufacturing system in use with the liquefier assembly and a drive mechanism.

FIG. 17 is a top view of a tenth alternative liquefier assembly, which includes a pair of opposing actuators and a cylindrical frame.

DETAILED DESCRIPTION

Figure 1:
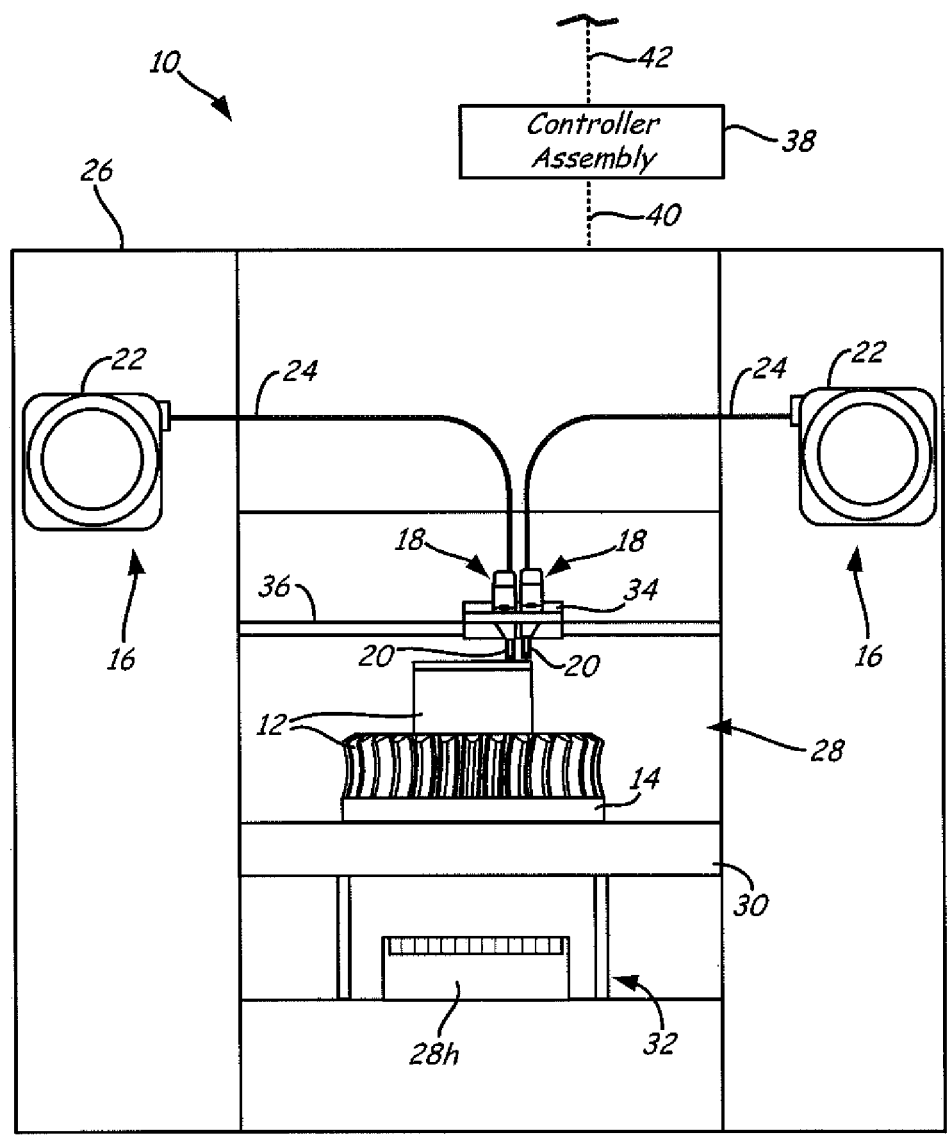
FIG. 1 is a front view of an additive manufacturing system configured to print 3D parts and support structures with the use of one or more liquefier assemblies of the present disclosure.

The present disclosure is directed to a liquefier assembly for use in an additive manufacturing system to print 3D parts and support structures in a layer-by-layer manner using an additive manufacturing technique. The liquefier assembly includes a liquefier and two different mechanisms for extruding a molten consumable material from the liquefier. In particular, the two different mechanism includes (i) one or more drive mechanisms that feed a consumable material to the liquefier, and that generate axial pressure (e.g., a viscosity-pump action) to extrude the molten material from the liquefier, and (ii) one or more actuators that generate rapid surges and draw backs of the molten material from the liquefier.

As discussed below, the actuator(s) are configured to transversely compress and release the liquefier, or a portion thereof, in a controlled manner to generate the surges and draw backs of the molten material. It has been found that liquefiers with particular geometries, such as ribbon liquefiers, can transversely compress and expand under applied loads to extrude molten materials with very fast time responses. In fact, these time responses can be significantly faster than those achievable with slower-reacting, filament drive mechanisms.

While not wishing to be bound by theory, the fast time responses are believed to be achieved because the pressure change in the region near the nozzle tip can occur simultaneously with the pressure change at the inlet end of the liquefier. As such, there is no propagation delay that may otherwise occur, as the pressure wave makes its way down the liquefier. Additionally, the flow conditions near the wall of in a conventional liquefier are believed to be a complicated mix of stick and slip in the liquefier. However, in this current case, the wall condition may initially be fixed as the stick condition.

This provides a unique mechanism for rapidly changing extrudate flow rates, which can be utilized in a controlled manner to supplement a slower-reacting drive mechanism, such as a filament drive mechanism. In particular, the transverse compressions and expansions change the cross-sectional area of the liquefier without changing its perimeter dimensions. Stated in volumetric terms, the transverse compressions and expansions change the volume of the liquefier without changing its surface area. This, in combination with the squishable or flowable nature of the molten material, can be readily modeled and accurately controlled. As such, changes in the extrudate flow rate from the print head can more accurately model a predicted flow rate change. This accordingly allows the print head to produce roads with accurate and consistent volumes while moving along a variety of different tool path trajectories that have non-steady-state conditions, such as road starts and stops, corners, and other conditions where the extrudate flow rates may vary.

The liquefier assembly may have a variety of configurations to accommodate different gantry mechanisms of additive manufacturing systems. In some embodiments, such as shown below in FIGS. 2-17, the liquefier assembly has a single-stage arrangement, where the solid consumable material is fed to and melted in the same liquefier that is compressed and released by the actuator(s).

In another aspect, the present disclosure is directed to a liquefier assembly having a liquefier that is self-heating. In this aspect, the liquefier may directly receive an applied electrical current that can generate resistive heating along the liquefier. The resistance to the applied electrical may also be used to measure and monitor the temperature of the liquefier 52 in real time. The self-heating liquefier can be used in combination with the above-mentioned liquefier assembly having the transversely-compressible liquefier and the actuator(s). Alternatively, the self-heating liquefier may be distinct and independent of the above-mentioned, transversely-compressible liquefier assembly, as discussed below.

In either aspect, the liquefier assembly may be used with any suitable additive manufacturing system. For instance, system 10 is an example additive manufacturing system for printing 3D parts or models and corresponding support structures (e.g., 3D part 12 and support structure 14) using a layer-based, additive manufacturing technique. Suitable additive manufacturing systems for system 10 include extrusion-based systems developed by Stratasys, Inc., Eden Prairie, Minn., such as fused deposition modeling systems under the trademark "FDM". In the shown embodiment, 3D part 12 and support structure 14 are respectively printed from part and support materials of consumable assemblies 16 with the use of print heads 18, where each print head 18 preferably includes a liquefier assembly 20 of the present disclosure.

Consumable assemblies 16 each include a container portion 22, which is an easily loadable, removable, and replaceable container device that retains a supply of a consumable filament for printing with system 10. Each container portion 22 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802.

In alternative embodiments, container portions 22 may be replaced with other supply sources of consumable materials, where the consumable materials may be any suitable media type, such as filaments, powders, pellets, slugs, and the like. For instance, in embodiments in which the consumable materials are provided in powder form, container portions 22 may be replaced with one or more hoppers, such as discussed in Bosveld et al., U.S. Publication No. 2013/0333798.

Each container portion 22 preferably engages with a guide tube 24, which interconnects the container portion 22 to its associated print head 18. Accordingly, a drive mechanism of print head 18 (and/or of system 10) draws successive segments of the consumable filament from container portion 22, through guide tube 24, to the liquefier assembly 20 of the print head 18.

In some embodiments, print heads 18 and guide tubes 24 are fixed sub-components of system 10, and each consumable assembly 16 includes a container portion 22 and the retained consumable filament. However, in alternative embodiments, print head 18, container portion 22, and guide tube 24 are sub-components of consumable assembly 16, such that print head 18, container portion 22, and guide tube 24 are collectively replaced in an interchangeable manner, as discussed in Swanson, U.S. Pat. No. 8,403,658.

As further shown in FIG. 1, system 10 may also include system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays or other receiving areas configured to receive container portions 22 of consumable assemblies 16. In alternative embodiments, the container bays may be omitted to reduce the overall footprint of system 10. In these embodiments, container portions 22 may stand adjacent to system casing 26, while providing sufficient ranges of movement for guide tubes 24 and print heads 18.

Chamber 28 is an example build environment that contains platen 30 for printing 3D part 12 and support structure 14, where chamber 28 may be may be optionally omitted and/or replaced with different types of build environments. For example, 3D part 12 and support structure 14 may be built in a build environment that is open to ambient conditions or may be enclosed with alternative structures (e.g., flexible curtains). In the shown example, the interior volume of chamber 28 may be heated with heater 28h to reduce the rate at which the part and support materials solidify after being extruded and deposited (e.g., to reduce distortions and curling). Heater 28h may be any suitable device or assembly for heating the interior volume of chamber 28, such as by radiant heating and/or by circulating heated air or other gas (e.g., inert gases). In alternative embodiments, heater 28h may be replaced with other conditioning devices, such as a cooling unit to generate and circulate cooling air or other gas. The particular thermal conditions for the build environment may vary depending on the particular consumable materials used.

Platen 30 is a platform on which 3D part 12 and support structure 14 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309; may be fabricated from plastic, corrugated cardboard, or other suitable material; and may also include a flexible polymeric film or liner, painter's tape, polyimide tape, adhesive laminate (e.g., an applied glue), or other disposable fabrication for adhering deposited material onto the platen 30 or onto the build substrate. In some embodiments, platen 30 and/or the build substrate may be heated, such as with one or more electrically-resistive heating elements.

Platen gantry 32 is a gantry assembly configured to move platen 30 along (or substantially along) the vertical z-axis. Platen gantry 32 may operate with one or more motors (e.g., stepper motors and encoded DC motors), gears, pulleys, belts, screws, robotic arms, and the like.

Head carriage 34 is an example effector unit configured to receive and retain one or both print heads 18, and is supported by head gantry 36. Examples of suitable devices for head carriage 34, and techniques for retaining print heads 18 in head carriage 34 and head gantry 36, include those disclosed in Crump, U.S. Pat. No. 5,340,433; Comb et al., U.S. Pat. No. 8,153,182; and Swanson et al., U.S. Pat. No. 8,647,102.

Head carriage 34 preferably retains each print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a linear or pivoting manner). In some embodiments, as mentioned above, print heads 18 may be removably interchanged from head carriage 34, such as with a snap-fit mechanism. In further embodiments, print heads 18 may optionally be retrofitted into an existing system 10.

In the shown embodiment, head gantry 36 is a robotic mechanism configured to move head carriage 34 (and the retained print heads 18) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Publication No. 2013/0078073, where head gantry 36 may also support deformable baffles (not shown) that define a ceiling for chamber 28.

While illustrated as a bridge-type gantry, head gantry 36 may utilize any suitable robotic mechanism for moving head carriage 34 (and the retained print heads 18), such as with one or more motors (e.g., stepper motors and encoded DC motors), gears, pulleys, belts, screws, robotic arms, and the like. In some preferred embodiments, each print head 18 is retained by a multi-stage robotic mechanism.

In a further alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 12 and support structure 14 along the x-axis or the y-axis. In another example, platen 30 and/or head carriage 34 (and print heads 18) may be moved relative to each other in a non-Cartesian coordinate system, such as in a polar coordinate system.

System 10 also includes controller assembly 38, which is one or more computer-based systems configured to operate the components of system 10. Controller assembly 38 may communicate over communication line 40 with the various components of system 10, such as print heads 18 (including liquefier assemblies 20), chamber 28 (e.g., heater 28h), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10.

Additionally, controller assembly 38 may also communicate over communication line 42 with external devices, such as other computers and servers over a network connection (e.g., an internet connection, a local area network (LAN) connection, a universal serial bus (USB) connection, a cellular connection, and the like). While communication lines 40 and 42 are each illustrated as a single signal line, they may each include one or more electrical, optical, and/or wireless signal lines and intermediate control circuits, where portions of communication line(s) 40 may also be subcomponents of the print heads 18 and liquefier assemblies 20. For instance, in some embodiments, communication line(s) 40 may include wireless components for communicating with devices that accelerate and decelerate quickly (e.g., high-g-force gantries), where physical cable reliability could potentially be an issue.

In some embodiments, the one or more computer-based systems of controller assembly 38 are internal to system 10, allowing a user to operate system 10 over a network communication line 42, such as from an external computer in the same or similar manner as a two-dimensional printer. Alternatively, controller assembly 38 may also include one or more external computer-based systems (e.g., desktop, laptop, server-based, cloud-based, tablet, mobile media device, and the like) that may communicate with the internal computer-based system(s) of controller assembly 38, as well as communicating over a network via communication line 42.

In this alternative embodiment, the processing functions of controller assembly 38 discussed below may be divided between the internal and external computer-based systems. In yet another alternative embodiment, the computer-based system(s) of controller assembly 38 may all be located external to system 10 (e.g., one or more external computers), and may communicate with system 10 over communication line 40.

During a printing operation, controller assembly 38 may command platen gantry 32 to move platen 30 to a predetermined height within chamber 28. Controller assembly 38 may then command head gantry 36 to move head carriage 34 (and the retained print heads 18) around in the horizontal x-y plane above chamber 28. Controller assembly 38 may also command print heads 18 to selectively draw successive segments of the consumable filaments (or other consumable materials) from container portions 22 and through guide tubes 24, respectively.

The successive segments of each consumable filament are then melted in liquefier assembly 20 of the respective print head 18 to produce a molten material. The downward movement of the filament functions as a viscosity pump to extrude the molten material as an extrudate. As briefly mentioned above, there is a time response delay between when controller assembly 38 commands the drive mechanism to change the feed rate of the consumable filament to the liquefier, and when the extrudate flow rate from the liquefier actually changes. As such, controller assembly 38 may also command an actuator assembly of liquefier assembly 20 to generate fast-responding surges and draw backs of the extrudate from the liquefier, thereby supplementing the slower-reacting, viscosity-pump action from the drive mechanism.

Upon exiting liquefier assembly 20, the resulting extrudate may be deposited onto platen 30 as a series of roads for printing 3D part 12 or support structure 14 in a layer-by-layer manner. For example, 3D part 12 or support structure 14 may be printed or otherwise built in three dimensions by producing successive layers of the deposited roads in two-dimensional, cross-sectional patterns stacked on top of each other. In some applications, such as discussed in Crump, U.S. Pat. No. 5,121,329, the deposited roads may also extend into free space above the x-y build plane, such as with vertically-extending curved arcs. After the print operation is complete, the resulting 3D part 12 and support structure 14 may be removed from chamber 28, and support structure 14 may be removed from 3D part 12. 3D part 12 may then undergo one or more additional post-processing steps, as desired.

Figure 2:
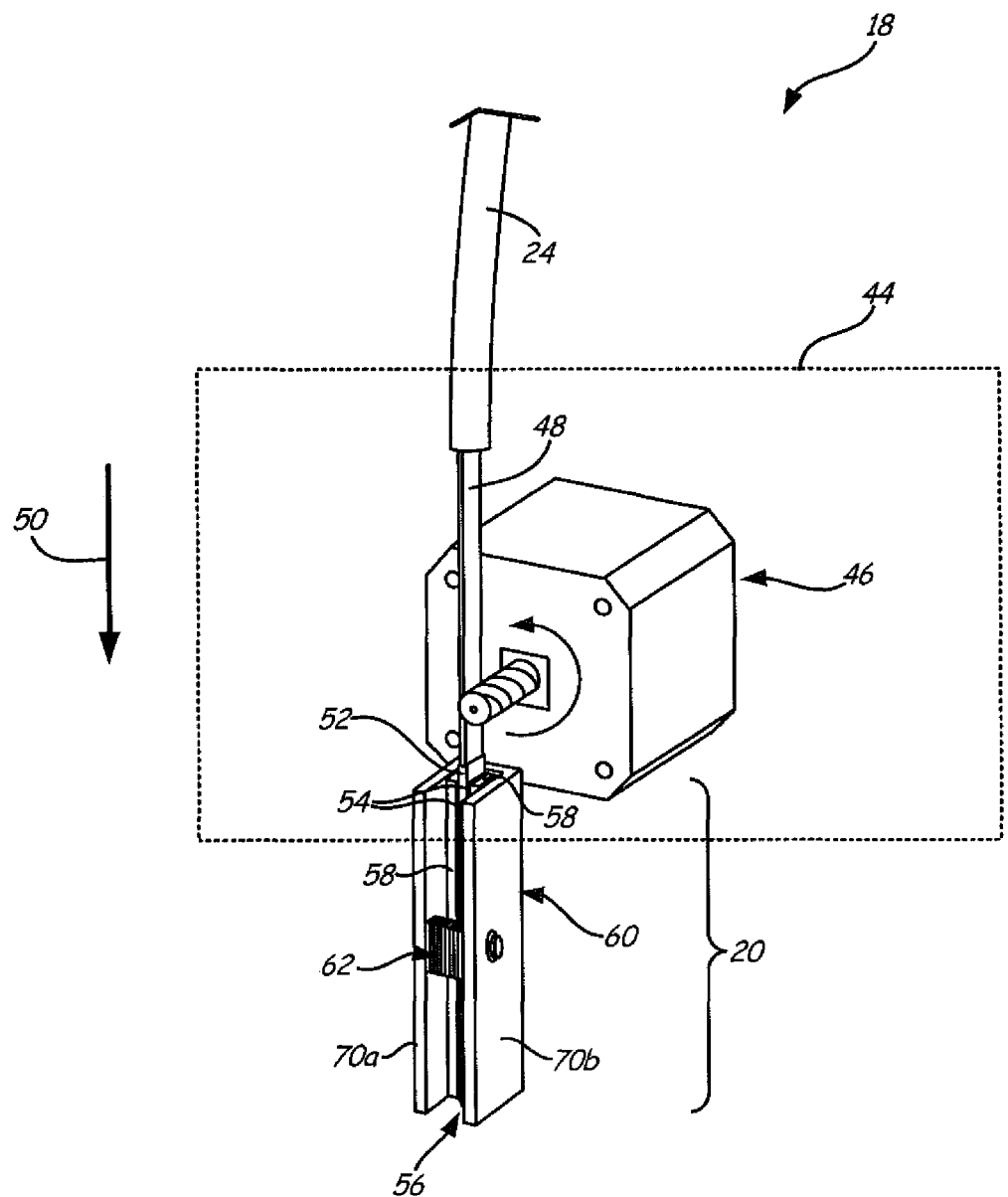
FIG. 2 is a perspective view of a print head retaining a drive mechanism and a liquefier assembly of the present disclosure.

FIG. 2 is an exploded view of an example print head 18, which includes housing 44, drive mechanism 46, and a liquefier assembly 20 of the present disclosure, which are shown in use with filament 48. Housing 44 may include any suitable design for use in system 10, where guide tube 24 preferably engages housing 44 or otherwise directs filament 48 into housing 44, and liquefier assembly 20 may extend downward from housing 44. Examples of suitable designs for housing 44 include those disclosed in Swanson et al., U.S. Pat. Nos. 8,403,658 and 8,647,102. Alternatively, housing 44 may be omitted, if desired. Furthermore, in some embodiments, drive mechanism 46 may be a sub-component of liquefier assembly 20.

Drive mechanism 46 is a motorized device for feeding filament 48 (or other consumable material), such as one or more rotatable wheels, gears, shafts, and/or screws that are operably connected to one or more motors (e.g., electric stepper and encoded DC motors). Examples of suitable devices for drive mechanism 46 include knurled, geared, or toothed-based wheels, such as discussed in LaBossiere et al., U.S. Pat. Nos. 7,384,255 and 7,604,470; and in Batchelder et al., U.S. Pat. No. 8,236,227. Additional examples include internally-threaded components (e.g., helical coils), such as disclosed in Batchelder et al., U.S. Pat. No. 7,896,209; and rotatable, toothed-shafts, such as disclosed in Swanson et al., U.S. Pat. No. 8,647,102; and Koop et al., U.S. Publication No. 2014/0159273.

In some embodiments, drive mechanism 46 may function as a screw pump for feeding a filament, powder, or pellets to liquefier assembly 20. The screw pump is particularly suitable in the embodiments in which liquefier assembly 20 includes a multiple-component liquefier (e.g., as shown below in FIG. 21). Examples of suitable screw pumps for driving or feeding filaments include those discussed in Skubic et al., U.S. Pat. No. 7,891,964. Examples of suitable screw pumps for driving or feeding powders and/or pellets include those discussed in Bosveld et al., U.S. Publication No. 2013/0333798. In other embodiments, drive mechanism 46 may function as a displacement pump.

In the shown embodiment, drive mechanism 46 is a filament drive mechanism that is located upstream from liquefier assembly 20, and is configured to feed successive segments of filament 48 from guide tube 24 to liquefier assembly 20 under motorized power, based on commands from controller assembly 38. Drive mechanism 46 may also include any suitable bearing surface (e.g., a rotating bearing surface, not shown) configured to support the opposing side of filament 48 while drive mechanism 46 is engaged with filament 48. As used herein, the terms "upstream" and "downstream" are made with reference to a filament feed direction and a molten material flow direction, as illustrated by arrow 50.

While drive mechanism 46 is illustrated in FIG. 2 as being positioned directly upstream from liquefier assembly 20, in alternative embodiments, one or more drive mechanisms may be positioned at any suitable location(s) along the pathway of filament 48 between (and including) container 22 and liquefier assembly 20. For instance, in some embodiments, a spool drive mechanism (not shown) may be used to engage with a spool in container 22, where the spool holds a wound supply of filament 48. In this case, the spool drive mechanism may rotate the spool to feed filament 48 through guide tube 24 and into liquefier assembly 20 (rather than directly engaging filament 48).

Figure 3:
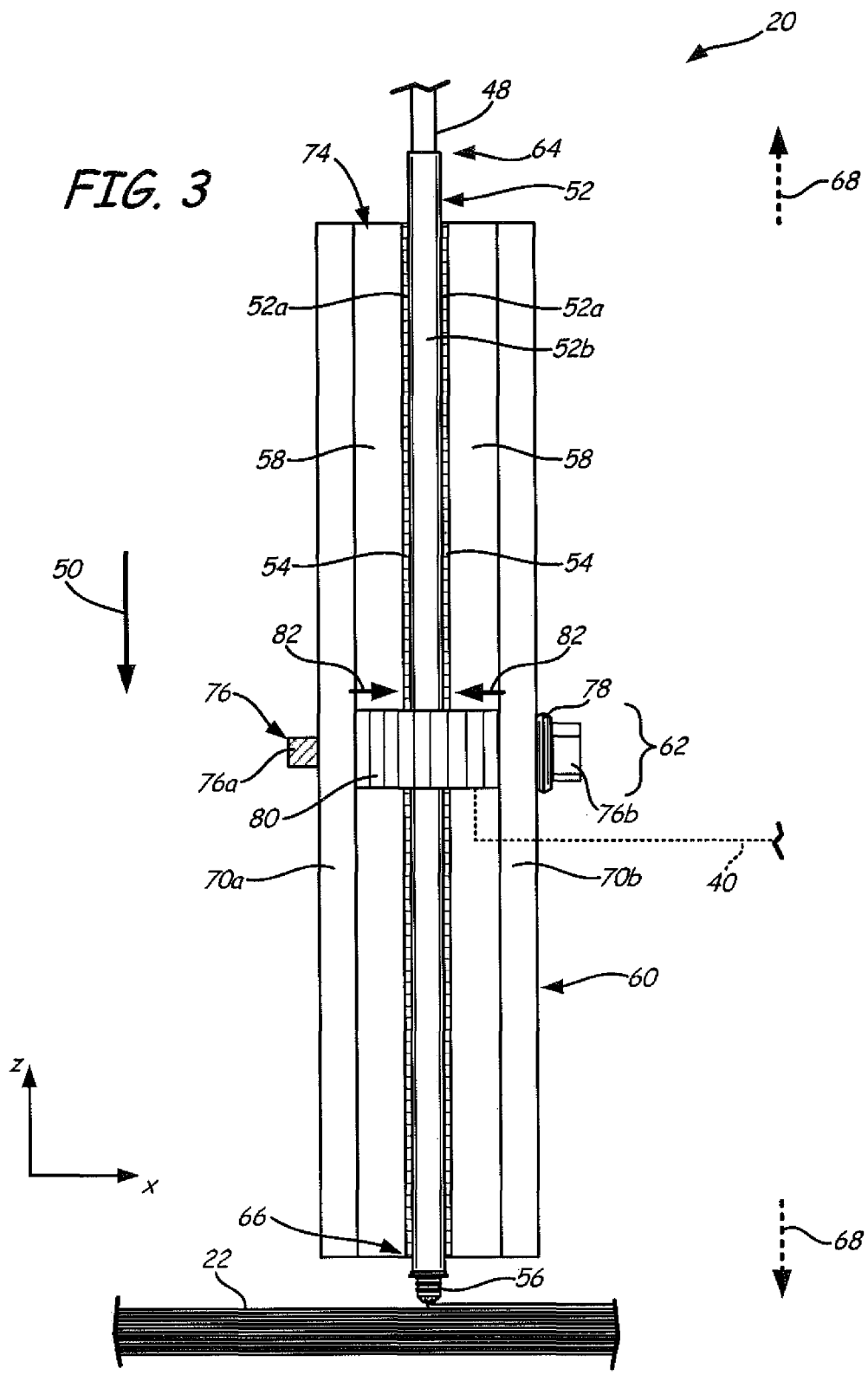
FIG. 3 is a front view of the liquefier assembly in use during a printing operation to print a 3D part.

Alternatively, drive mechanism 46 may engage filament 48 through a port in liquefier assembly 20, such as discussed in Batchelder et al., U.S. Pat. No. 7,897,074. In yet another embodiment, drive mechanism 46 may be located along guide tube 24 between container 22 and print head 18, and engage filament 48 through a port or intersection in guide tube 24. Furthermore, multiple drive mechanisms may be used together. For example, a first drive mechanism may be used to feed filament 48 from container 22 to print head 18. A second drive mechanism (e.g., drive mechanism 46) retained by print head 18 may then receive the fed filament 48 from the first drive mechanism, and feed the received filament 48 into liquefier assembly 20. As shown in FIGS. 2 and 3, liquefier assembly 20 includes liquefier 52, heater assemblies 54, nozzle 56, spacers 58, clam frame 60, and actuator mechanism 62, where liquefier 52 in this embodiment is a single-component liquefier, where filament 48 is fed to and melted in the same liquefier 52 that is compressed and released by actuator mechanism 62. Furthermore, liquefier assembly 20 is discussed herein as having a ribbon liquefier architecture for use with a ribbon filament. The term "ribbon filament" as used herein refers to a filament (e.g., filament 48) having a substantially rectangular, arcuate, and/or an elliptical cross-section along its longitudinal length, which may include one or more surface tracks for engaging with drive mechanism 46, such as disclosed in Batchelder et al., U.S. Pat. No. 8,236,227. Correspondingly, the term "ribbon liquefier" as used herein refers to a hollow liquefier (e.g., liquefier 52) having a substantially rectangular, arcuate, and/or an elliptical hollow, inner-channel cross-section along its longitudinal length.

For each of the ribbon filament and the ribbon liquefier, the cross-section has a width and a thickness, where a maximum extent of the width is at least about 2.5 times greater than a maximum extent of the thickness. For a ribbon filament or ribbon liquefier having a substantially rectangular or arcuate cross-section, the cross-section may have sharp corners (i.e., 90-degree corners) and/or rounded corners. In aspects in which the ribbon filament has an elliptical cross-section, the elliptical cross-section preferably has an eccentricity of about 0.8 or greater, and more preferably of about 0.9 or greater. Examples of suitable ribbon filaments and ribbon liquefier architectures for filament 48 and liquefier assembly 20 include those discussed in Batchelder et al., U.S. Pat. Nos. 8,221,669; 8,236,227; and 8,439,665.

As shown in FIG. 3, liquefier 52 includes opposing faces 52a and opposing lateral ends 52b, where faces 52a are the larger dimensions of liquefier 52 (corresponding to the width of liquefier 52) and lateral ends 52b are the smaller dimensions of liquefier 52 (corresponding to the thickness of liquefier 52). Liquefier 52 is preferably fabricated from one or more rigid, thermally-conductive materials, such as stainless steel, and may be fabricated in a variety of different manners. In a first example, the cross-sectional dimensions of liquefier 52 may be attained by flattening or otherwise collapsing or crushing a cylindrical liquefier, such as around a shim insert.

Alternatively, liquefier 52 may be produced by stamping a pair of metal sheets into half-sections, which may then be welded or otherwise sealed together to attain the desired cross-sectional dimensions. In a further example, a U-shaped trench may be laser cut or otherwise machined into a metal block to form the side walls of liquefier 52, which may then be covered with one or more metal membranes that encase the trench to form the inner channel. In yet another example, liquefier 52 can be formed with silicon membranes that span a lithographically-formed channel or trench. In some cases, such as for low-temperature applications, faces 52a of liquefier 52 can be formed from polymeric films, such as polyimide films.

Liquefier 52 also has an inlet end 64 and an outlet end 66, which are preferably offset from each other along longitudinal axis 68. Inlet end 64 is configured to receive filament 48 from drive mechanism 46, where inlet end 64 and filament 48 preferably have complementary cross-sectional geometries, such as discussed in Batchelder et al., U.S. Pat. Nos. 8,221,669 and 8,439,665. Outlet end 66 is the downstream portion of liquefier 52 and terminates in nozzle 56.

Suitable dimensions for liquefier 52 include those discussed in Batchelder et al., U.S. Pat. Nos. 8,221,669 and 8,439,665. In some preferred embodiments, liquefier 52 has a length along longitudinal axis 68 ranging from about 7.6 millimeters (about 0.3 inches) to about 130 millimeters (about 5 inches), more preferably from about 50 millimeters (about 2 inches) to about 100 millimeters (about 4 inches). Suitable hollow, inner-channel thicknesses between faces 52a range from about 0.25 millimeters (about 10 mils) to about 2.5 millimeters (about 100 mils), and in some embodiments from about 0.76 millimeters (about 30 mils) to about 1.3 millimeters (about 50 mils).

Suitable hollow, inner-channel widths between lateral ends 52b (perpendicular to the inner-channel widths) range from about 2.5 millimeters (about 100 mils) to about 10.2 millimeters (about 400 mils), in some embodiments from about 5.1 millimeters (about 200 mils) to about 7.6 millimeters (about 300 mils). Suitable wall thicknesses for liquefier 52 range from about 130 micrometers (about 5 mils) to about 500 micrometers (about 20 mils). The above-discussed widths and thicknesses for liquefier 52 are based on the maximum extents of the widths and thicknesses.

Furthermore, liquefier 52 preferably has wall thicknesses, at least at faces 52a, such that when fabricated from one or more polycrystalline metals, the transverse compression and expansion on faces 52a preferably generate less than about 0.3% strain. In embodiments in which liquefier 52 is fabricated from one or more amorphous metals and/or polymers, the transverse compression and expansion on faces 52a preferably generate less than about 3% strain.

Heater assemblies 54 are one or more heating elements configured to conduct heat to liquefier 52 for melting the received filament 48 within liquefier 52, based on commands (e.g., received electrical power over line 40) from controller assembly 38. For instance, heater assemblies 54 may include one or more coils of resistive wire wrapped around liquefier 52, one or more heater blocks secured to liquefier 52, one or more electrical-resistance heaters secured to liquefier 52, one or more inductive heating elements, or any other suitable thermoelectric heating element(s) for heating liquefier 52 (and optionally, for cooling liquefier 52).

In the shown example, heater assemblies 54 are in mating contact with faces 52a of liquefier 52, such as disclosed in Batchelder et al., U.S. Pat. Nos. 8,221,669; 8,236,227; and 8,439,665; and in Batchelder et al., U.S. patent application Ser. No. 14/046,301. In this embodiment, heater assemblies 54 preferably have sufficient flexibilities to flex with the compressions and expansions of liquefier 52, as explained below. Alternatively (or additionally), as discussed below, one or more heater assemblies 54 may be located at one or both lateral ends 52b of liquefier 52.

Additionally, liquefier 52 may also incorporate a separately unique and beneficial feature, which is distinct and independent of the transversely-compressible nature of liquefier 52 and the use of actuator mechanism 62. In this embodiment, liquefier 52, which is preferably thermally and electrically conductive, may directly receive an applied electrical current (e.g., via line 40) that can generate resistive heating along liquefier 52. Controller assembly 38 may also measure and monitor the temperature of liquefier 52 in real time from the resistance to the applied electrical current (e.g., via line 40). This effectively provides a self-heating and/or self-sensing liquefier, which is particularly beneficial with the transversely-compressible nature of liquefier 52 since it can optionally eliminate the need for heater assemblies 54 located at faces 52a, and can also reduce component costs. In addition to liquefier 52, this self-heating feature of the present disclosure may also be used with any suitable thin-walled liquefier (cylindrical and/or non-cylindrical), as discussed below.

Nozzle 56 is a small-diameter nozzle at outlet end 66 of liquefier 52, and is configured to extrude the molten material at a desired road width. Preferred inner tip diameters for nozzle 56 include diameters up to about 760 micrometers (about 0.030 inches), and more preferably range from about 125 micrometers (about 0.005 inches) to about 510 micrometers (about 0.020 inches). In some embodiments, nozzle 56 may include one or more recessed grooves between annular rings to produce roads having different road widths, as discussed in Swanson et al., U.S. Publication No. 2014/0048969. In other embodiments, nozzle 90 may have larger inner tip diameters, such as for large extrudate embodiments.

Nozzle 56 may also have an axial channel with any suitable length-to-diameter ratio. For example, in some embodiments, nozzle 56 may have an axial channel with a length-to-diameter ratio to generate high flow resistance, such as a ratio of about 2:1 to about 5:1. In other embodiments, nozzle 56 may have an axial channel with a length-to-diameter ratio to generate lower flow resistance, such as a ratio less than about 1:1. Accordingly, suitable length-to-diameter ratios for the axial channel of nozzle 56 may range from about 1:2 to about 5:1, where in some low-flow resistance embodiments, ratios ranging from about 1:2 to about 1:1 may be preferred.

Spacers 58 are a pair of opposing spacer blocks or assemblies disposed between heater assemblies 54 and clam frame 60. Each spacer 58 is preferably produced from one or more materials that are relatively compliant to provide good mating interfaces between liquefier 52, heating assemblies 54, and clam frame 60, but that are also rigid enough to prevent spacers 58 from being significantly compressed.

In some embodiments, such as discussed in Batchelder et al., U.S. Patent Application Publication No. 2015/0097053, the material(s) for spacers 58 may also have modest thermal conductivities to draw heat from liquefier 52 and heater assemblies 54, and may also have sets of indentations (not shown) for thermally isolating separate heating zones. Suitable materials for spacers 58 include sheet silicate materials, such as sheet mica. In some alternative embodiments, spacers 58 may be omitted, and liquefier 52 and (optionally) heater assemblies 54 may be directly retained by clam frame 60.

Figure 4:
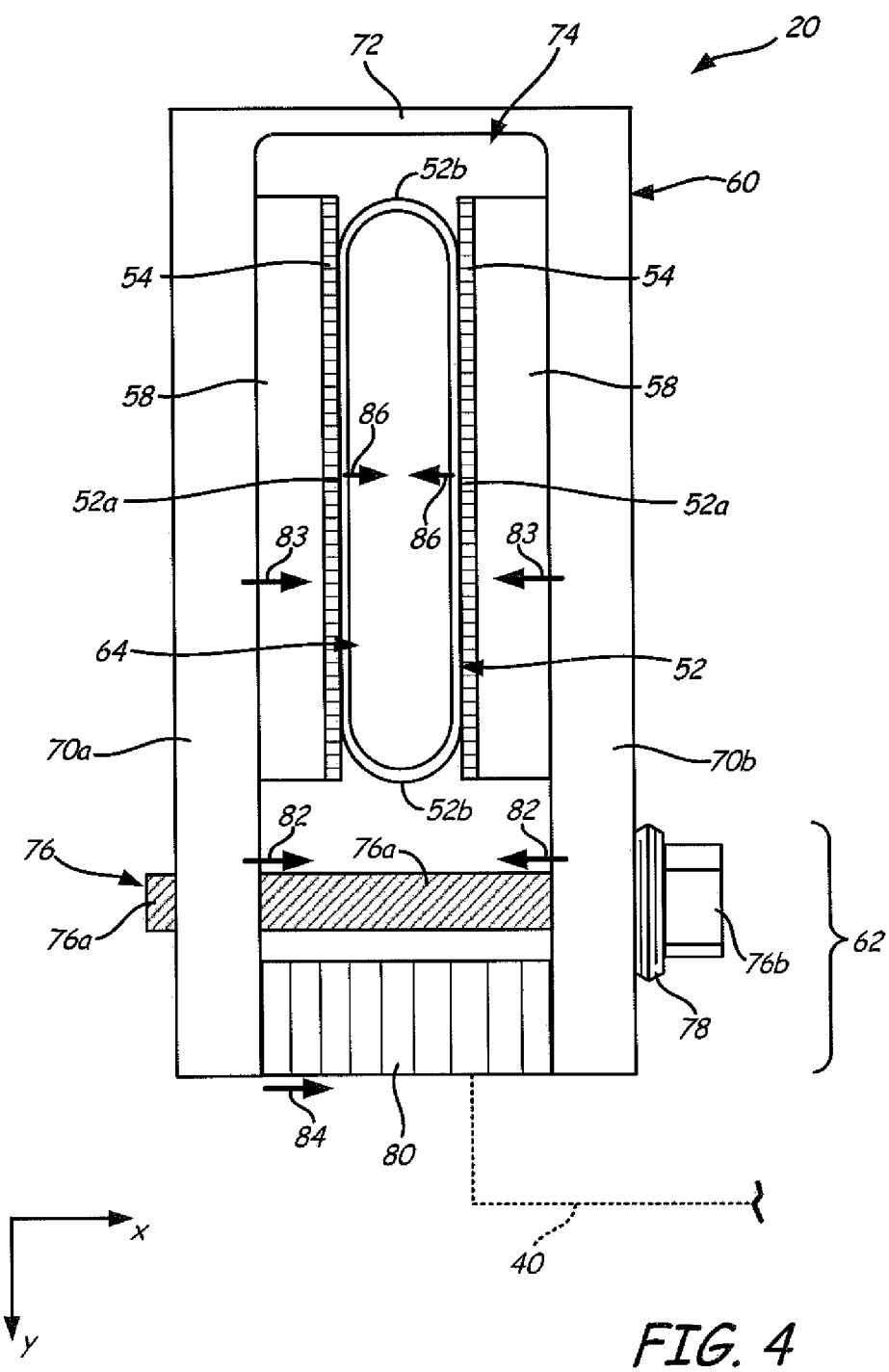
FIG. 4 is a top view of the liquefier assembly, illustrating a liquefier compression step.

As best shown in FIGS. 3 and 4, clam frame 60 is a U-shaped or C-shaped rigid frame that includes a pair of opposing flanges 70a and 70b, which, in the shown example, extend generally parallel to each other from a base portion 72. Alternatively, flanges 70a and 70b may extend at non-parallel angles, such as in a V-shaped arrangement. Base portion 72 and flanges 70a and 70b collectively define a channel 74 that extends along longitudinal axis 68, preferably at least as long a liquefier 52. In the shown arrangement, liquefier 52 is disposed within channel 74, between the opposing heater assemblies 54, where heater assemblies 54 are held against faces 52a of liquefier 52 by spacers 58 and flanges 70a and 70b. Flanges 70a and 70b preferably sandwich liquefier 52, heater assemblies 54, and spacers 58 under sufficient compression to maintain good interfacial contact between the components, and to prevent them from slipping apart, although it is preferable that liquefier 52 be replaceable in the assembly.

Clam frame 60 may be fabricated from one or more materials that provide a strong and rigid structure, such as one or more metals (e.g., stainless steel and aluminum). Additionally, clam frame 60 is preferably capable of maintaining compression on the components retained within channel 74, while also being capable of flexing without breaking, cracking, or plastically deforming.

During the printing operation, drive mechanism 46 feeds successive segments of filament 48 into inlet end 64 of liquefier 52. In this case, filament 48 is pushed into inlet end 64. Alternatively, in a ported liquefier embodiment, such as discussed in Batchelder et al., U.S. Pat. No. 7,897,074, where drive mechanism 46 is located downstream from inlet end 64, drive mechanism 46 may feed successive segments of filament 48 into inlet end 64 by pulling filament 48 into inlet end 64.

As filament 48 passes through liquefier 52 in the direction of arrow 50, heater assemblies 54 thermally melt the received successive segments, where the molten portion of the filament material forms a meniscus around the unmelted portion of filament 48. The downward movement of filament 48 functions as a viscosity pump to pressurize and extrude the molten material as an extrudate for printing 3D part 12 (or support structure 14).

As can be appreciated, when printing 3D part 12 or support structure 14, the extrudate flow from nozzle 56 is rarely held at a constant, steady-state rate. Instead, the extrudate flow rate is typically being changed repeatedly to accommodate a variety of different tool path conditions, such as road start accelerations, road stop decelerations, cornering decelerations and accelerations, road width variations, and the like.

These flow rate changes are traditionally controlled by adjusting the feed rate of filament 48 into liquefier 52 with drive mechanism 46, based on commands from controller assembly 38. This correspondingly adjusts the pressure generated by the viscosity-pump action on the molten material. However, when controller assembly 38 commands drive mechanism 46 to change the feed rate of filament 48 into liquefier 52 (to change the extrudate flow rate from nozzle 56), there is a time response delay between the signal command and when the extrusion rate from nozzle 56 actually changes. This is due to response limitations in the motor of drive mechanism 46 and the viscosity-pump action in liquefier 52.

Previous solutions to this time response delay include operating under predictive models, where controller assembly 38 commands drive mechanism 46 with pre-pump motions, roll-back motions, and overdrives (e.g., as disclosed in Comb, U.S. Pat. Nos. 6,054,077 and 6,547,995). These solutions have proven to be effective at reducing the effects of the time response delays for a variety of non-steady-state conditions. However, because (in the shown embodiment) liquefier 52 operates in an open-loop manner, which does not include feedback of the extrudate flow rate from nozzle 56, changes in the extrudate flow rate will continue to exhibit time response limitations.

Liquefier assembly 20, however, supplements this slower-responding, viscosity-pump action with the compression and expansion of liquefier 52. As briefly mentioned above, it has been found that liquefiers with particular cross-sectional geometries, such as ribbon liquefiers (e.g., liquefier 52), are susceptible to transversely-applied pressures, and can compress inwardly and expand outwardly at faces 52a. For instance, it has been found that liquefier 52 expands or balloons transversely outward at faces 52a due to internal pressures that are generated during printing operations. These internal pressures are typically generated by the viscosity-pump action of the fed filament 48, and the thermal expansion of the filament material upon melting.

Controller assembly 38 can utilize the compressibility of liquefier 52 in a unique manner to generate fast surges of the extrudate from nozzle 56 when compressing liquefier 52, and rapid draw backs of the extrudate flow upward from nozzle 56 when liquefier 52 is allowed to expand. These fast-responding operations can supplement the slower-responding flow rate changes from the viscosity-pump action to improve extrudate flow accuracies during non-steady-state conditions.

In particular, controller assembly 38 can command actuator mechanism 62 to controllably pull flanges 70a and 70b together (to compress liquefier 52) and to release arms 70a and 70b (to release the compression on liquefier 52). In the embodiment shown in FIGS. 3 and 4, actuator mechanism 62 includes tension bolt 76, biasing spring 78, and piezoelectric actuator 80. Tension bolt 76 includes shaft portion 76a and head nut 76b, where shaft portion 76a extends freely through flange 70b and is threadedly engaged with flange 70a. Head nut 76b is located outside of flange 70b, and biasing spring 78 is pressed between head nut 76b and flange 70b. This arrangement biases flanges 70a and 70b together in the directions of arrows 82, which pulls flanges 70a and 70b together against spacers 58, heater assemblies 54, and liquefier 52, and opposes any expansion pressures of liquefier 52.

Piezoelectric actuator 80 is an example actuator for quickly generating transverse compressions on liquefier 52. As shown, piezoelectric actuator 80 has a piezoelectric-stack configuration that is secured between flanges 70a and 70b, and is configured to extend and contract based on the application of electrical power, such as from line 40. Controller assembly 38 preferably sets a baseline contraction setting for piezoelectric actuator 80 at an intermediate state or mid-position between full expansion and full contraction. This allows piezoelectric actuator 80 to both contract and extend as needed. Actuator mechanism 62 also preferably includes one or more displacement sensors (e.g., capacitive sensors, not shown) that monitor and/or correct displacement errors in piezoelectric actuator 80, which may be due to hysteresis, thermal effects, and the like. As such, the baseline contraction setting for piezoelectric actuator 80 may optionally be updated to account for these displacement errors.

As shown in FIG. 4, when controller assembly 38 commands piezoelectric actuator 80 to contract, as depicted by arrow 84, the resistance against biasing springs 78 is reduced, allowing biasing springs 78 to further press flanges 70a and 70b together against liquefier 52, heater assemblies 54, and spacers 58, as depicted by arrows 83. Because heater assemblies 54 and spacers 58 are relatively incompressible compared to liquefier 52, the transversely-applied pressure quickly compresses faces 52a of liquefier 52 together, as depicted by arrows 86, which rapidly reduces the internal volume of liquefier 52 relative to its initial cross section. Because the molten material in liquefier 52 is also relatively incompressible, the quick compression of liquefier 52 results in a surge or rapid jetting of the molten material from nozzle 56.

Piezoelectric actuator 80 is a particularly suitable actuator for compressing and releasing liquefier 52 in this controlled manner due to its ability to generate high compressive loads at very fast frequencies. However, this is only achievable because liquefier 52 itself can compress in response to the compressive loads. Flanges 70a and 70b preferably compress liquefier 52 along its entire length, or at least a substantial portion of its entire length. This allows a large internal volume of liquefier 52 to be compressed relative to its surface area, which remains substantially unchanged, thereby allowing a relatively large volume of the molten material to be rapidly extruded from nozzle 56 in the surge, if desired.

Figure 5:
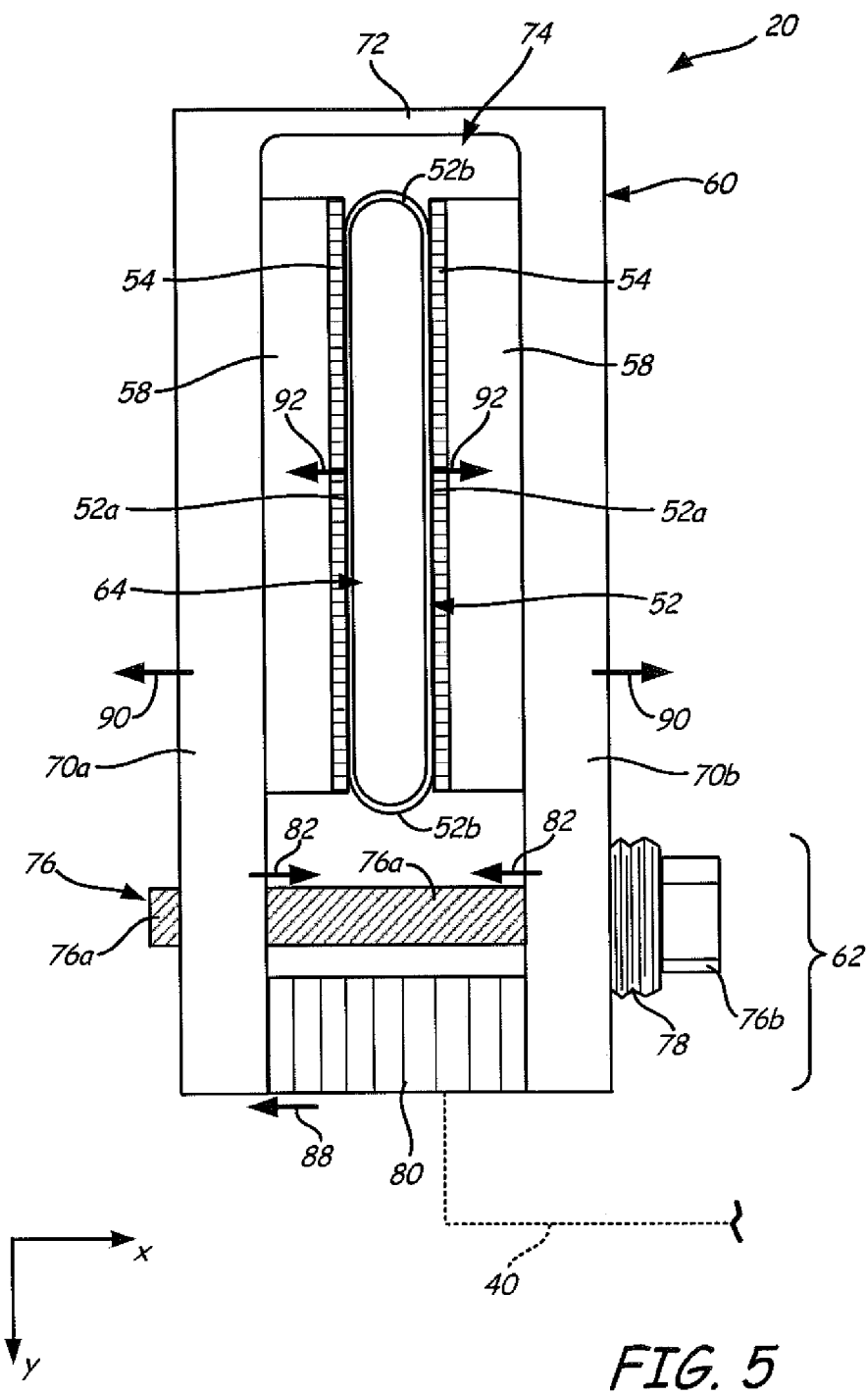
FIG. 5 is a top view of the liquefier assembly, illustrating a liquefier release and expansion step.

Additionally, as shown in FIG. 5, when controller assembly 38 commands piezoelectric actuator 80 to extend, as depicted by arrow 88, flanges 70a and 70b are pressed apart against the bias of biasing springs 78, as depicted by arrows 90. This reduces the transverse pressure applied to liquefier 52, allowing liquefier 52 to expand back outward, as depicted by arrows 92, such as back to its original state (e.g., based on the baseline contraction setting of piezoelectric actuator 80), or to a fully expanded state (e.g., for extrudate draw back).

As can be appreciated, the compressions applied to liquefier 52 by actuator mechanism 62 and flanges 70a and 70b are transversely-applied pressures that are external to liquefier 52, and are applied to the outer surface of liquefier 52 (e.g., at faces 52a). This is in comparison to internal pressures that are generated by the viscosity-pump action of filament 48 or by thermal expansions of the filament material upon melting, or any other pressures that otherwise affect liquefier 52 from the inside or interior region of liquefier 52.

FIG. 6 illustrates an exemplary architecture for controller assembly 38 in use with liquefier assembly 20 and drive mechanism 46. Controller assembly 38 may include any suitable computer-based hardware, such as user interface 94, memory controller 96, processor 98, storage media 100, input/output (I/O) controller 102, and communication adapter 104. Controller assembly 38 may also include a variety of additional components that are contained in conventional computers, servers, media devices, signal processing devices, and/or printer controllers.

User interface 94 is a user-operated interface (e.g., keyboards, touch pads, touch-screen displays, display monitors, and other eye, voice, movement, or hand-operated controls) configured to operate controller assembly 38. Memory controller 96 is a circuit assembly that interfaces the components of controller assembly 38 with one or more volatile random access memory (RAM) modules of storage media 100. Processor 98 is one or more computer-processing units configured to operate controller assembly 38, optionally with memory controller 96, and preferably with related processing circuitry (e.g., programmable gate arrays, digital and analog components, and the like). For instance, processor 98 may include one or more microprocessor-based and/or microcontroller-based units, one or more central processing units, and/or one or more front-end processing units.

Storage media 100 is one or more internal and/or external data storage devices or computer storage media for controller assembly 38, such as volatile RAM modules, read-only memory modules, optical media, magnetic media (e.g., hard disc drives), solid-state media (e.g., FLASH memory and solid-state drives), analog media, and the like. Storage media 100 may retain an executable copy of processing program 106, and may retain one or more digital models to be printed with system 10, such as digital model 108. Controller assembly 38 may receive digital model 108 over communication line 42, where digital model 108 may have any suitable file format, such as an STL file format, an AMF file format, and the like.

Processing program 106 is one or more pre-processing and/or post-processing programs for optionally orienting digital model 108, slicing the oriented digital model 108 into layers, generating support structures, generating tool path instructions for printing each sliced layer with system 10, and the like. I/O controller 102 is a circuit assembly that interfaces memory controller 96, processor 98, and storage media 100 with various input and output components of controller assembly 38, including user interface 94 and communication adapter 104. Communication adapter 104 is one or more wired or wireless transmitter/receiver adapters configured to communicate over communication lines 40 and 42.

The commands from controller assembly 38 to the components of system 10 and print head 18, such as drive mechanism 46, heating assemblies 54, and actuator mechanism 62, are performed with one or more of user interface 94, memory controller 96, processor 98, storage media 100, input/output (I/O) controller 102, communication adapter 104, processing program 106, and/or other suitable hardware and software implementations, as is understood by those skilled in the art.

Controller assembly 38 can use the compressible nature of liquefier 52 in a variety of manners to change the extrudate flow rates from liquefier assembly 20. For instance, controller assembly 38 may command actuator mechanism 62 to compresses and expand liquefier 52 in a controlled manner that supplements the commands relayed to drive mechanism 46 (or any other drive mechanism) to change the feed rates of filament 48 into liquefier 52.

In one embodiment, controller assembly 38 compares (i) the desired extrudate flow rates from nozzle 56 to achieve extruded roads with expected dimensions, with (ii) the extrudate flow rates from nozzle 56 that are actually achievable with the commands given to drive mechanism 46. The actual extrudate flow rates from nozzle 56 can be obtained in a variety of manners, such as with a low-pass filter (e.g., a single pole Bessel filter) and/or a compiled table of pre-modeled extrudate flow data, such as obtained from a velocimetry sensor as disclosed in Batchelder, U.S. patent application Ser. No. 13/840,538. Controller assembly 38 can then command piezoelectric actuator 80 to extend or contract to reduce or eliminate these flow rate differences.

For instance controller assembly 38 can treat the extrudate volumetric flow rates along a tool path as a time-varying, flow rate signal Q(t), which has a low-pass component $Q_{lp}(t)$ that commands drive mechanism 46, and a high-pass component $Q_{hp}(t)$ that commands piezoelectric actuator 80, such as depicted by Equation 1:

$$Q_{hp}(t) = Q(t) - Q_{lp}(t) \quad \text{(Equation 1)}$$

The expression of Equation 1 may also be represented in terms of time-varying volumes V(t) and $V_{lp}(t)$, which are the integrals of the signals Q(t) and $Q_{lp}(t)$, as depicted by Equation 2:

$$Q_{hp}(t) = \frac{d}{dt}(V(t) - V_{lp}(t)) \quad \text{(Equation 2)}$$

The model under Equation 2 has the benefit that the integrals of the high-pass signals $Q_{hp}(t)$ are zero over time periods that are long compared to the inverses of the low-pass signals $Q_{lp}(t)$, and no corrections are required to maintain the baseline contraction setting for piezoelectric actuator 80.

Controller assembly 38 may store one or more of these time-varying signals Q(t), $Q_{lp}(t)$, $Q_{hp}(t)$, V(t), $V_{lp}(t)$, and/or $V_{hp}(t)$ on storage media 100 as one or more data files (e.g., data files 110, 112, and 114), and may use these data files 110, 112, and/or 114 with processing program 106 to generate the tool path instructions for printing each sliced layer with system 10.

Figure 7A:
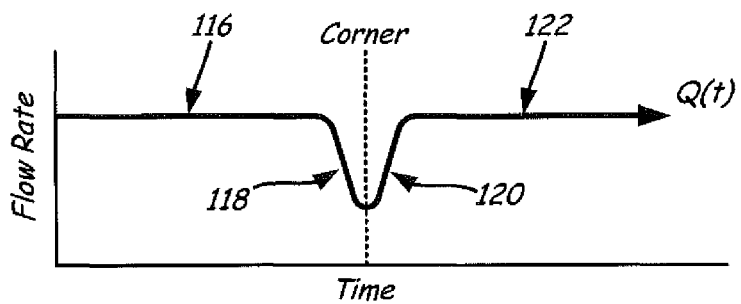
FIGS. 7A-7C are signal plots of extrudate volumetric flow rates over time for a print head traversing around a tool path corner.

The combined use of the low and high pass signals in this crossover manner is particularly suitable for tool path trajectories such as cornering, road starts, and road ends. For example, as shown in FIG. 7A, when approaching a tool path corner at a given extrudate flow rate (e.g., at region 116), the extrudate flow rate is preferably reduced (region 118) to coincide with the reduced velocity of print head 18 when print head 18 approaches and turns at the corner. The extrudate flow rate is then preferably increased again (region 120) to coincide with the increased velocity of print head 18 upon exiting the tool path corner, and then held at the original flow rate (region 122) as print head 18 continues along the tool path.

Figure 7B:
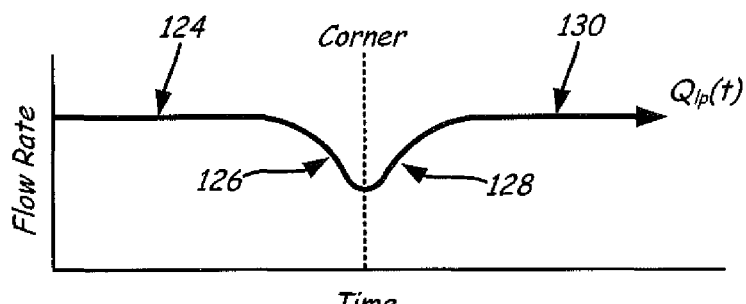

FIG. 7B illustrates the flow rate component for drive mechanism 46, based on the achievable time responses with drive mechanism 46 (e.g., based on a low-pass filter and/or a pre-modeled extrudate flow data). As can be seen, during the steady-state extrudate flow (e.g., at region 124), the signals $Q_{lp}(t)$ are substantially the same as the signals Q(t) at region 116. However, when controller assembly 38 attempts to reduce the extrudate flow rate with drive mechanism 46 (region 126), the viscosity-pump action of drive mechanism 46 and filament 48 cannot match the desired flow rate profile of the signal Q(t) at region 118.

Similarly, when controller assembly 38 attempts to increase the extrudate flow rate again after passing the corner (region 128), the viscosity-pump action cannot match the desired flow rate acceleration of the signal Q(t) at region 120. Instead, the signals $Q_{lp}(t)$ take longer to reach the original flow rate (region 130).

Figure 7C:
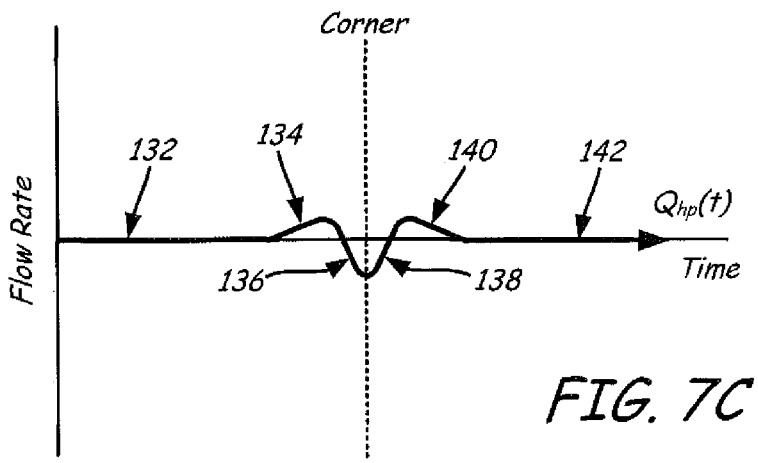

As such, controller assembly 38 may supplement the difference between the signals Q(t) (shown in FIG. 7A) and the signals $Q_{lp}(t)$ (shown in FIG. 7B) at each time interval with the signals $Q_{hp}(t)$ shown in FIG. 7C. These signals $Q_{hp}(t)$ may be relayed to piezoelectric actuator 80 over communication line 40 (e.g., as applied voltages).

As shown in FIG. 7C, the signals $Q_{hp}(t)$ are initially zeroed to the baseline contraction setting for piezoelectric actuator 80 (region 132). As such, during a steady-state extrudate flow (e.g., at region 124), the compressive state of liquefier 52 is held constant. However, upon approaching the corner, the relayed signals $Q_{hp}(t)$ increase (region 134) to offset the differences between the signals Q(t) and $Q_{lp}(t)$. While initially appearing to be counterintuitive, this allows the resulting extrudate flow rate from nozzle 56 to more closely match the desired flow rate indicated by the signals Q(t).

The increased signals $Q_{hp}(t)$ at region 134 cause piezoelectric actuator 80 to contract (depicted by arrow 84, shown above in FIG. 4). As discussed above, this rapidly presses flanges 70a and 70b closer together under the bias of biasing spring 78 (depicted by arrows 83, shown above in FIG. 4). This correspondingly compresses liquefier 52 (depicted by arrows 86, shown above in FIG. 4) to increase the extrudate flow from nozzle 56 in a controlled manner.

However, when the signals Q(t) decrease at region 118, the signals $Q_{hp}(t)$ relayed to piezoelectric actuator 80 then decrease (region 136) to continue to offset the differences between the signals Q(t) and $Q_{lp}(t)$. The decreased signals $Q_{hp}(t)$ at region 136 cause piezoelectric actuator 80 to extend (depicted by arrow 88, shown above in FIG. 5). As discussed above, this presses flanges 70a and 70b apart against the bias of biasing spring 78. This correspondingly allows liquefier 52 to transversely expand (depicted by arrows 92, shown above in FIG. 5) to reduce the extrudate flow from nozzle 56 in a controlled manner.

When the signals Q(t) increase at region 120 after passing the corner, the signals $Q_{hp}(t)$ relayed to piezoelectric actuator 80 increase (region 138) to continue to offset the differences between the signals Q(t) and $Q_{lp}(t)$. The increased signals $Q_{hp}(t)$ at region 138 again cause piezoelectric actuator 80 to contract, which compresses liquefier 52 (depicted by arrows 86, shown above in FIG. 4) to increase the extrudate flow from nozzle 56 in a controlled manner.

When the signals Q(t) increase back to the original flow rate at region 122, the signals $Q_{hp}(t)$ relayed to piezoelectric actuator 80 then decrease (region 140) to continue to offset the differences between the signals Q(t) and $Q_{lp}(t)$. The decreased signals $Q_{hp}(t)$ at region 140 cause piezoelectric actuator 80 to extend, which allows liquefier 52 to transversely expand (depicted by arrows 92, shown above in FIG. 5) to reduce the extrudate flow from nozzle 56 in a controlled manner.

The relayed signals $Q_{hp}(t)$ may continue to decrease back to the baseline contraction setting at a controlled rate that matches the rate at which the signals $Q_{lp}(t)$ take to reach the original flow rate at region 130. The signals $Q_{hp}(t)$ relayed to piezoelectric actuator 80 may then remain at the baseline contraction setting (region 142) until the next non-steady-state condition occurs. As can be appreciated by a comparison of FIGS. 7A-7C, the use of the compressions and expansions of liquefier 52 can increase the accuracies of the extrudate flow rates when traversing corners or other non-steady-state conditions. The increased accuracies accordingly allow print head 18 to produce roads with accurate and consistent volumes while moving along a variety of different tool path trajectories.

Similar profiles can be utilized for road start and road end conditions. For instance, during a road start, controller assembly 38 can operate drive mechanism 46 to begin the viscosity-pump action for extruding the molten material from nozzle 56. However, as discussed above for regions 120 and 128 (shown respectively in FIGS. 7A and 7B), the slower-responding, viscosity-pump action cannot match the desired flow rate acceleration of the signals Q(t). Instead, the signals $Q_{lp}(t)$ take longer to reach the desired flow rate.

As such, controller assembly 38 may also command piezoelectric actuator 80 to contract, which compresses liquefier 52 (depicted by arrows 86, shown above in FIG. 4) to increase the extrudate flow from nozzle 56 in a controlled manner such that the extrudate flow rate from nozzle 56 more closely matches the desired flow rate. When the signals $Q_{lp}(t)$ eventually catch up to the signals Q(t), controller assembly 38 may command piezoelectric actuator 80 to begin extending to release the compression on liquefier 52 in a gradual and controlled manner until the baseline contraction setting is reached again. The reduced extrudate flow rates that occur by the released compression on liquefier 52 may be compensated for by gradual increases in the signals $Q_{lp}(t)$ to hold the actual extrudate flow rate at the desired flow rate.

Similarly, when approaching or reaching a road end, controller assembly 38 can stop operating drive mechanism 46 to stop extruding the molten material from nozzle 56. However, the slower-responding, viscosity-pump action cannot match the desired flow rate decelerations of the signals Q(t). Instead, the signals $Q_{lp}(t)$ take longer to reach zero flow.

To compensate for this, controller assembly 38 may also command piezoelectric actuator 80 to extend, which allows liquefier 52 to transversely expand (depicted by arrows 92, shown above in FIG. 5) to quickly draw back the extrudate and halt the extrudate flow from nozzle 56. After the road end is reached, controller assembly 38 may command piezoelectric actuator 80 to begin contracting to compress liquefier 52 in a gradual and controlled manner until the baseline contraction setting is reached again. Liquefier assembly 20 is then ready to begin printing along the next tool path.

The models under Equations 1 and 2 may also account for pre-pump motions, roll-back motions, and/or overdrives of drive mechanism 46. For example, during a pre-pump motion of drive mechanism 46 at a road start, controller assembly 38 may expand and compress liquefier 52 in a similar manner to regions 138 and 140 (shown in FIG. 7C) such that the signals $Q_{hp}(t)$ compensate for the positive and negative differences between the signals Q(t) and $Q_{lp}(t)$. As such, controller assembly 38 may operate liquefier assembly 20 in combination with a variety of predictive flow-control models.

Additionally, while discussed above with reference to Equations 1 and 2 for compensating for differences between the signals Q(t) and $Q_{lp}(t)$, controller assembly 38 may operate actuator mechanism 62 using a variety of different flow-control models to achieve desired flow profiles, where the operations of actuator mechanism 62 transversely compress and expand liquefier 52 to change the extrudate flow rates with fast response times. For instance, in some embodiments, controller assembly 38 may rely solely on the transverse compression and/or expansion of liquefier 52 to change the extrudate flow rates. In these embodiments, controller assembly 38 may hold the signals $Q_{lp}(t)$ to drive mechanism 46 constant (or at zero), and only adjust the extrudate flows with compressions and expansions of liquefier 52 (e.g., with actuator mechanism 62).

An example of this operation can occur when print head 18 traverses around a tool path corner. When approaching the corner, controller assembly 38 may command actuator mechanism 62 to release the compression on liquefier 52 (from the baseline state) to reduce the extrudate flow rate. After passing the corner, controller assembly 38 may then command actuator mechanism 62 to compress liquefier 52 (back to the baseline state) to increase the extrudate flow rate back up to the original flow rate. During this entire operation around the corner, the signals $Q_{lp}(t)$ to drive mechanism 46 may be held constant, such that the viscosity-pump action functions as if in a steady-state condition.

Additionally, controller assembly 38 may alternative between operations of drive mechanism 46 and actuator mechanism 62 depending on particular tool path profiles. For example, when a slow and gradual flow rate acceleration or deceleration is needed, controller assembly 38 may rely solely on flow rate changes with drive mechanism 46, and hold the transverse pressure applied to liquefier 52 constant.

In another aspect of the present disclosure, controller assembly 38 may modulate piezoelectric actuator 80 at a high frequency to deposit the molten material as contact droplets rather than in a surge. Example frequencies for modulating piezoelectric actuator 80 range from about 500 hertz to about 10 kilohertz, and in some embodiments, from about 1 kilohertz to about 5 kilohertz. While not wishing to be bound by theory, it is believed that the high-frequency oscillations of piezoelectric actuator 80 may generate a shear thinning effect on the molten material within liquefier 52. This shear thinning effect can reduce the viscosity of the molten material from its low-shear level (e.g., about 3,000 poise for ABS) by as much as a factor of 100 (e.g., about 30 poise for sheared ABS). This is believed to produce contact droplets in a drop-on-demand manner.

The consumable materials for use in liquefier assembly 20 are typically not suitable for high-frequency, drop-on-demand depositions due to their higher viscosities. Examples of suitable consumable materials for use in liquefier assembly 20 (e.g., as filament 48) compositionally include thermoplastic materials, such acrylonitrile-butadiene-styrene (ABS) copolymers, polycarbonates, polysulfones, polyethersulfones, polyphenylsulfones, polyetherimides, polyamides, polystyrene, soluble support materials, breakaway support materials, and blends thereof. The consumable materials may also optionally include one or more additional additives, such as plasticizers, rheology modifiers, inert fillers, colorants, stabilizers, and combinations thereof. These consumable materials preferably melt-viscosities in liquefier assembly 20 that are greater than 2,000 poise in a non-sheared state, and that drop by a factor of 50 or greater, and in some embodiments by a factor of 90 or greater, when undergoing shear thinning.

In this embodiment, the bottom tip of nozzle 56 is preferably positioned along the z-axis close to the underlying surface that accumulates the extrudate, such as the top surface of platen 30 or a top layer of 3D part 12 or support structure 14. As such, the contact droplets that are formed have a very short distance to fall, or no distance to fall (i.e., the droplets remain in contact with the bottom tip of nozzle 56 and the surface at the same time).

Figure 8:
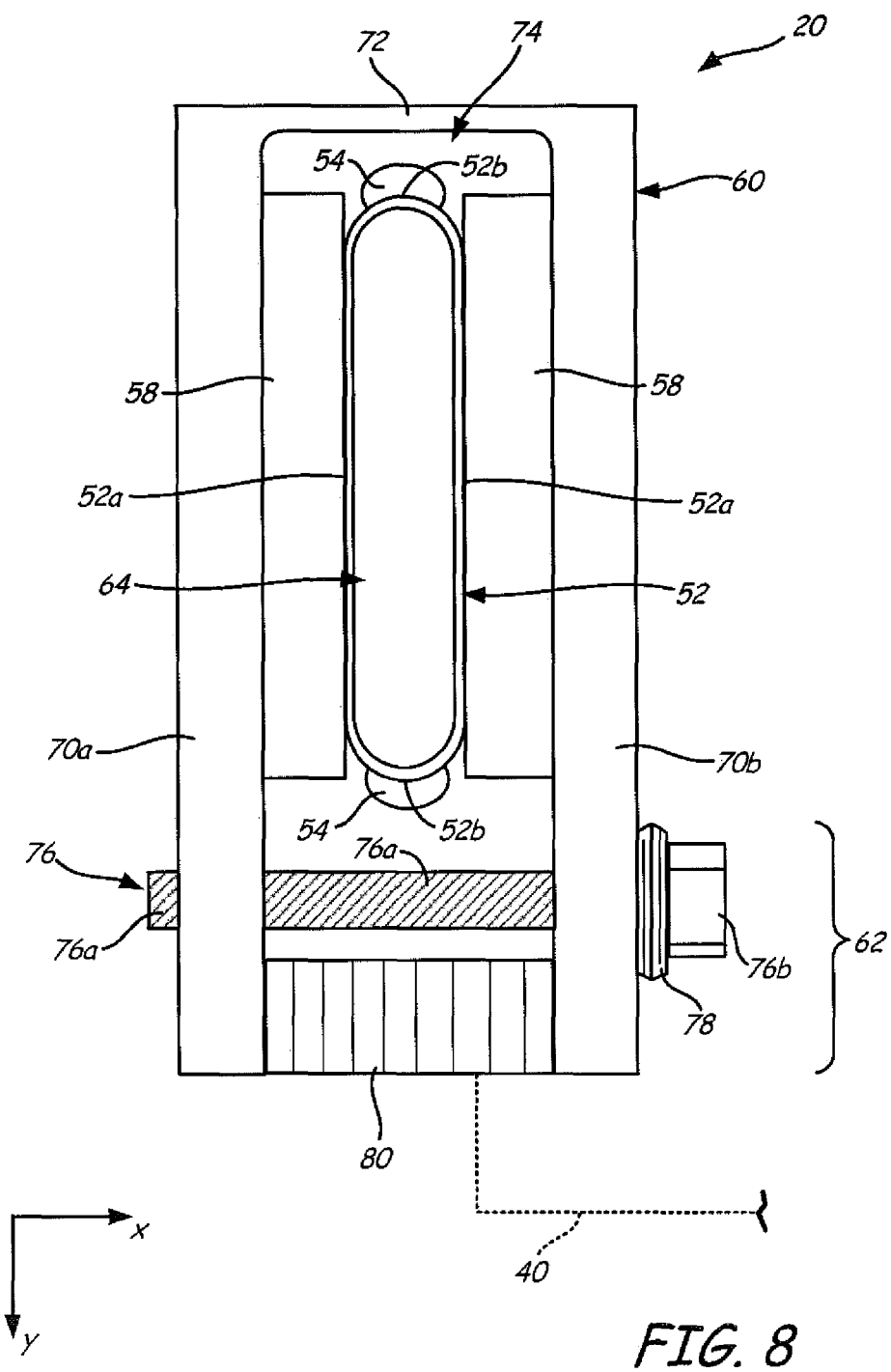
FIG. 8 is a top view of a first alternative liquefier assembly, which includes alternative heater assemblies secured to lateral ends of the liquefier.

While liquefier assembly 20 and actuator mechanism 62 are discussed above with the configurations shown in FIGS. 2-6, liquefier assembly 20 and actuator mechanism 62 may alternatively have a variety of different configurations. For example, FIG. 8 illustrates an alternative liquefier assembly 20 which includes heater assemblies 54 extending along lateral ends 52b of liquefier 52, rather than being disposed along faces 52a. In this embodiment, heater assemblies 54 may extend axially along lateral ends 52b, partially along the length of liquefier 52 down to outlet end 66 and/or nozzle 56. Heater assemblies 54 preferably do not extend upward to inlet end 64 to prevent filament 48 melting at inlet end 64, which can otherwise undesirably result in buckling or mushrooming effects.

One of the advantages of the ribbon architecture for liquefier 52 is the large heatable surface areas of faces 52a, and the relatively small thickness between them, which reduces the time required for heat to transfer across filament 48. As such, heater assemblies 54 as shown above in FIGS. 2-6, which conduct heat to faces 52a, can reduce time response delays due to the thermal melting of filament 48.

However, heater assemblies 54 may alternatively (or additionally) be placed in contact with lateral ends 52b of liquefier 52, as shown in FIG. 8. This embodiment is beneficial for preventing the compressions and expansions of liquefier 52 from damaging heater assemblies 54, or otherwise interfering with the mating contact between liquefier 52 and heater assemblies 54. It also allows clam frame 60 to mechanically close around liquefier 52, thereby increasing the strength of clam frame 60 and decreasing its required mass. In this case, each heater assembly 54 may include a brazed connection (e.g., copper wires brazed to lateral ends 52b), and may receive suitable electrical currents (e.g., about 35 amperes) to generate heat.

Figure 9:
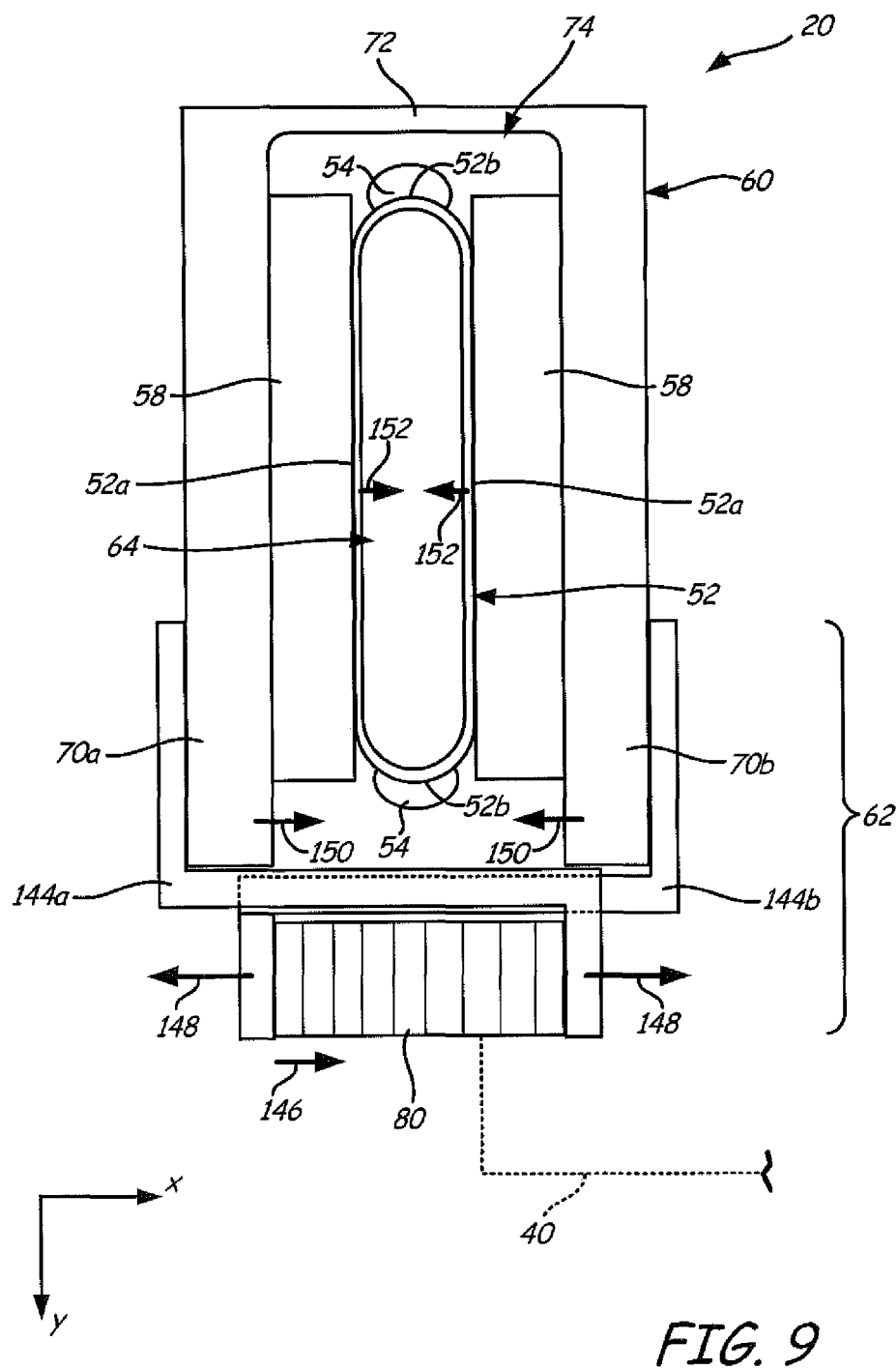
FIG. 9 is a top view of a second alternative liquefier assembly, which includes an actuator mechanism having a reverse-clamp arrangement.

FIG. 9 illustrates an alternative configuration for actuator mechanism 62, where tension bolt 76 and biasing spring 78 may be omitted, and replaced with clamp arms 144a and 144b that engage piezoelectric actuator 80 in a reverse-clamp arrangement. As shown, clamp arm 144a is secured to or integrally formed with flange 70a, and clamp arm 144b is secured to or integrally formed with flange 70b and passes below clamp arm 144a. Clamp arms 144a and 144b are each preferably rigid members (e.g., steel or aluminum) that effectively function as extensions of flanges 70 and 70b.

In this embodiment, controller assembly 38 operates piezoelectric actuator 80 in an opposite manner from that discussed above due to the reverse-clamp arrangement of clamp arms 144a and 144b. In particular, when controller assembly 38 commands piezoelectric actuator 80 to extend, as depicted by arrow 146, clamp arms 144a and 144b are pressed apart, as depicted by arrows 148. This accordingly, pulls flanges 70a and 70b together due to the reverse-clamp arrangement, as depicted by arrows 150, which accordingly compresses liquefier 52 transversely, as depicted by arrows 152.

Oppositely, when controller assembly 38 commands piezoelectric actuator 80 to contract, clamp arms 144a and 144b are pulled together, which presses flanges 70a and 70b apart. This accordingly releases the transverse pressure applied to liquefier 52. As such, due to the reverse-clamp arrangement, controller assembly 38 effectively inverts the longitudinal contraction and expansion signals relayed to piezoelectric actuator 80. This illustrates one of a variety of alternative configurations for actuator mechanism 62 that allow piezoelectric actuator 80 to compress and release liquefier 52.

The embodiments shown in FIGS. 2-6, 8, and 9 illustrate examples of designs for thermally isolating piezoelectric actuator 80 from liquefier 52 and heater assemblies 54. Piezoelectric actuators are typically sensitive to high temperatures. As such, piezoelectric actuator 80 is preferably thermally isolated from liquefier 52 and heater assemblies 54, such as with one or more insulating spacers, air gaps, heat sinks, and the like. Alternatively, piezoelectric actuator 80 may be replaced with any suitable actuator, such as actuators capable of compressing and expanding liquefier 52 at high frequencies (e.g., with less than one millisecond changes in pressure). For example, piezoelectric actuator 80 may be replaced with a hydraulic actuator, which removes the thermally-sensitive piezoelectric actuator from the heated regions of liquefier 52 and heater assemblies 54. Optionally, the hydraulic actuator may be driven by one or more piezoelectric stacks.

Figure 10:
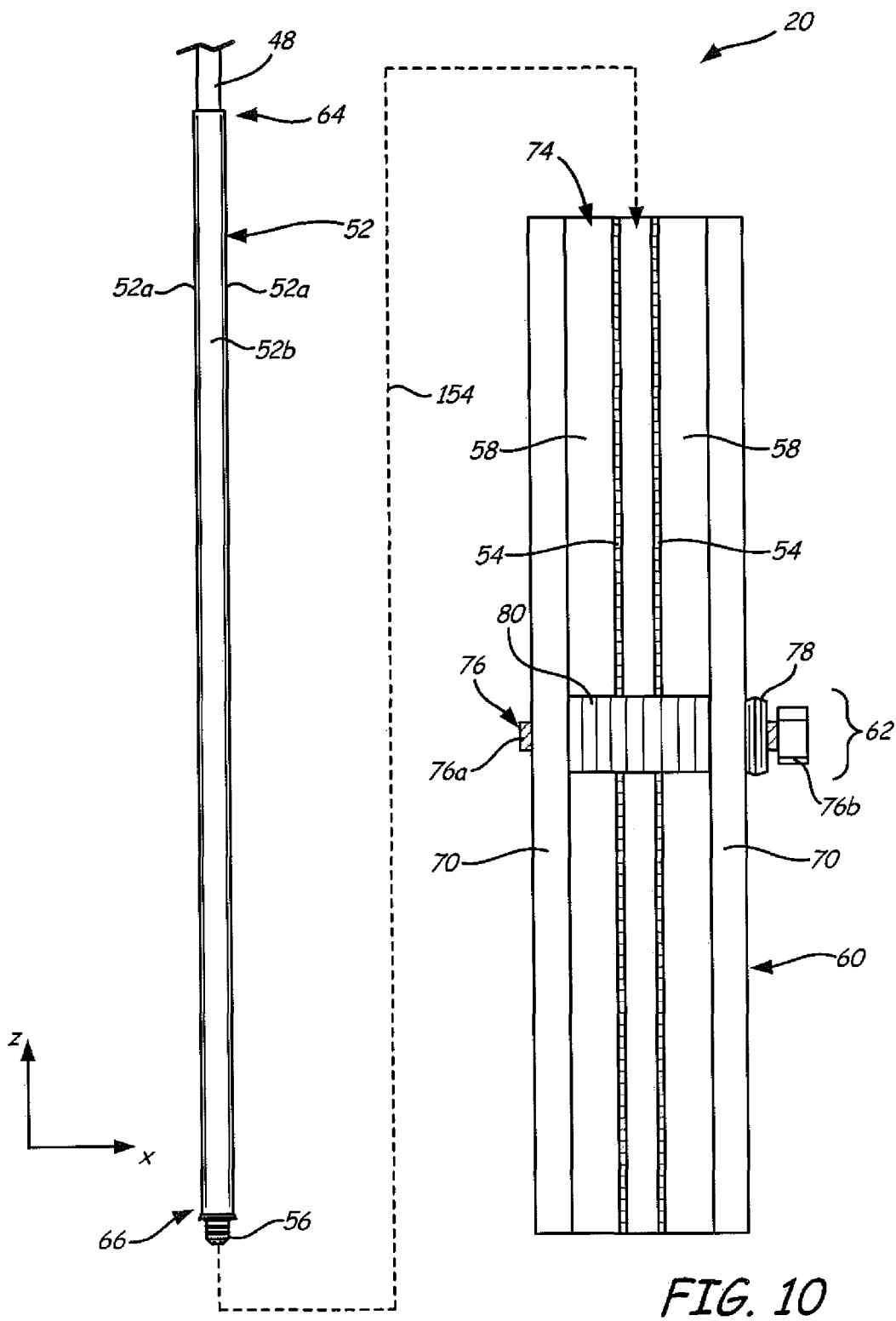
FIG. 10 is a front view of a third alternative liquefier assembly, which includes a removable and interchangeable liquefier.

FIG. 10 illustrates an embodiment in which liquefier 52 and nozzle 56 are subcomponents of the interchangeable consumable assembly 16, and the remaining components of liquefier assembly 20 and print head 18 are subcomponents of system 10. In this case, liquefier 52 may be inserted into channel 74 (as depicted by arrow 154) between heater assemblies 54, and tension bolt 62 may then be tightened to securely hold liquefier 52 in place.

Controller assembly 38 may then perform a calibration routine with piezoelectric actuator 80 to ensure that liquefier 52 is not unduly compressed by the tightening of tension bolt 62. When liquefier 52 needs to be replaced (e.g., with a new consumable assembly 16), tension bolt 62 may be loosened, liquefier 52 may be removed, and a new liquefier 52 may be inserted in the same manner as discussed above.

Figure 11:
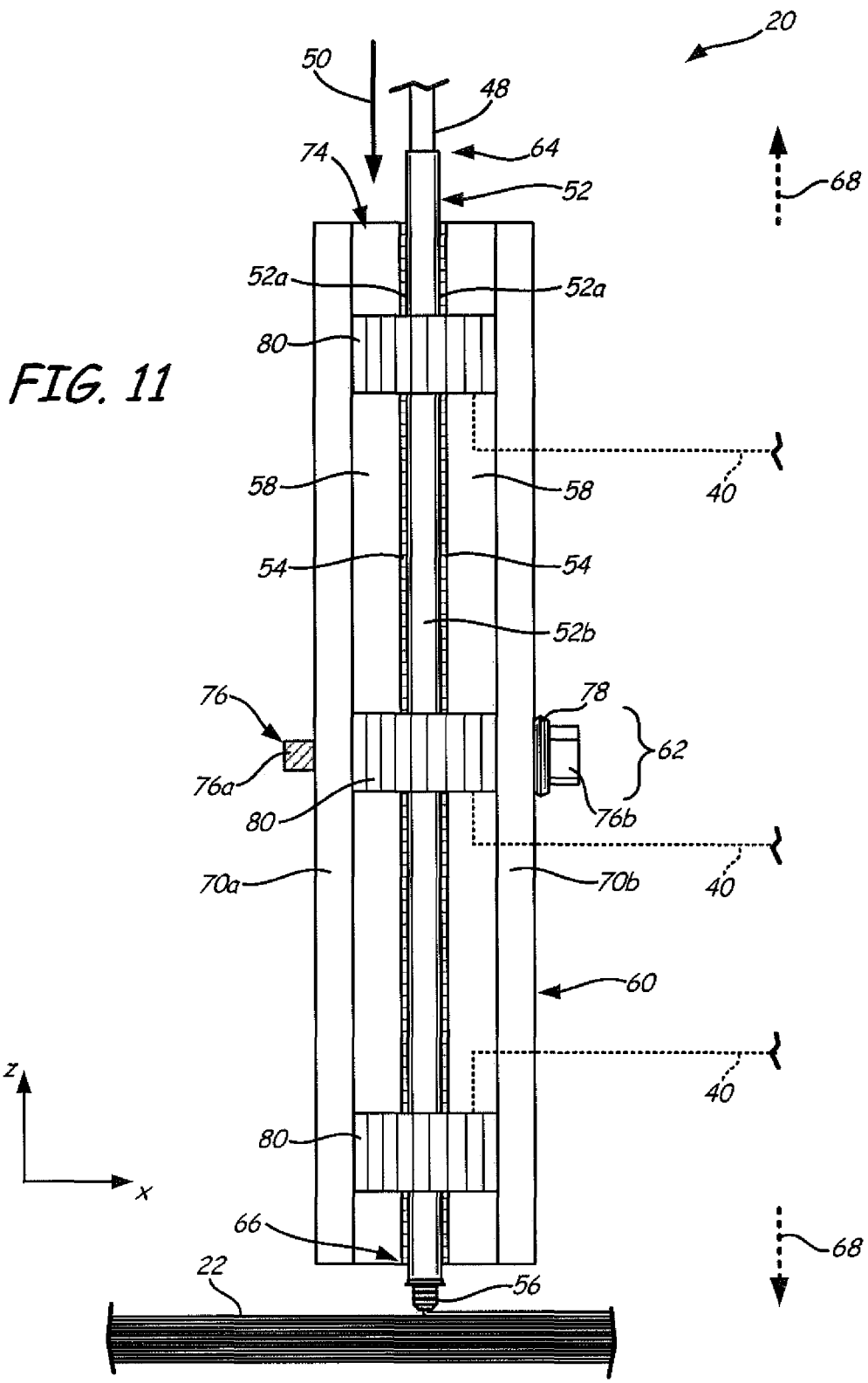
FIG. 11 is a front view of a fourth alternative liquefier assembly, which includes an actuator mechanism having multiple individual actuators offset along a longitudinal length of the liquefier assembly.

As shown in FIG. 11, actuator mechanism 62 may also incorporate multiple actuators, such as multiple piezoelectric actuators 80 offset from each other along longitudinal length 68. In this embodiment, controller assembly 38 may collectively command piezoelectric actuators 80 to contract and extend together to provide a compression and expansion along longitudinal length 68, if needed. The compressions and expansions may be performed in a uniform manner along longitudinal length 68. Alternatively (or additionally), the compressions and expansions may be performed in a radially-symmetric manner along longitudinal length 68 to generate peristalsis waves, if desired. Accordingly, liquefier assembly 20 may incorporate an actuator assembly having one or more actuators to compress and expand liquefier 52, based on command signals from controller assembly 38.

Figure 12:
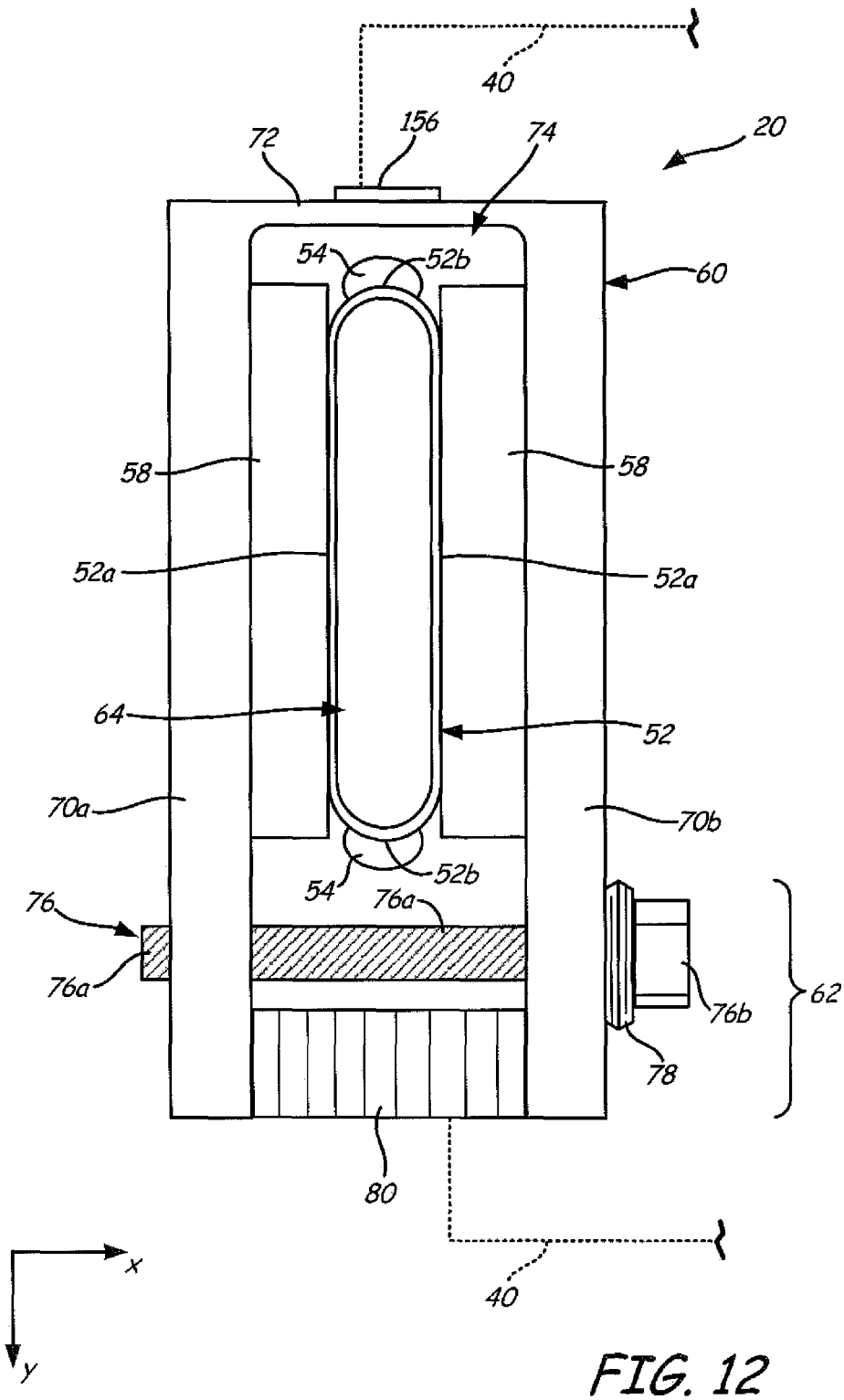
FIG. 12 is a top view of a fifth alternative liquefier assembly, which includes one or more sensors for measuring compressions and expansions on the liquefier assembly.

As shown in FIG. 12, liquefier assembly 20 may also include one or more sensors configured to measure compressions and expansions of liquefier assembly 20. For instance, liquefier assembly 20 may include one or more strain gauge sensors 156 secured to base portion 72 (or at any other suitable location of liquefier assembly 20), and offset from each other along longitudinal axis 68. This allows the compressions and expansions of base portion 72 (due to the flexing of flanges 70*a* and 70*b*) to be measured, and communicated to controller assembly 38 over communication line 40. Sensor(s) 156 may be used for a variety of purposes, such as real-time pressure measurements during printing operations (e.g., for feedback loops to controller assembly 38) and/or for purposes of calibrating piezoelectric actuators 80 with the compression levels applied to liquefier 52.

Figure 13:
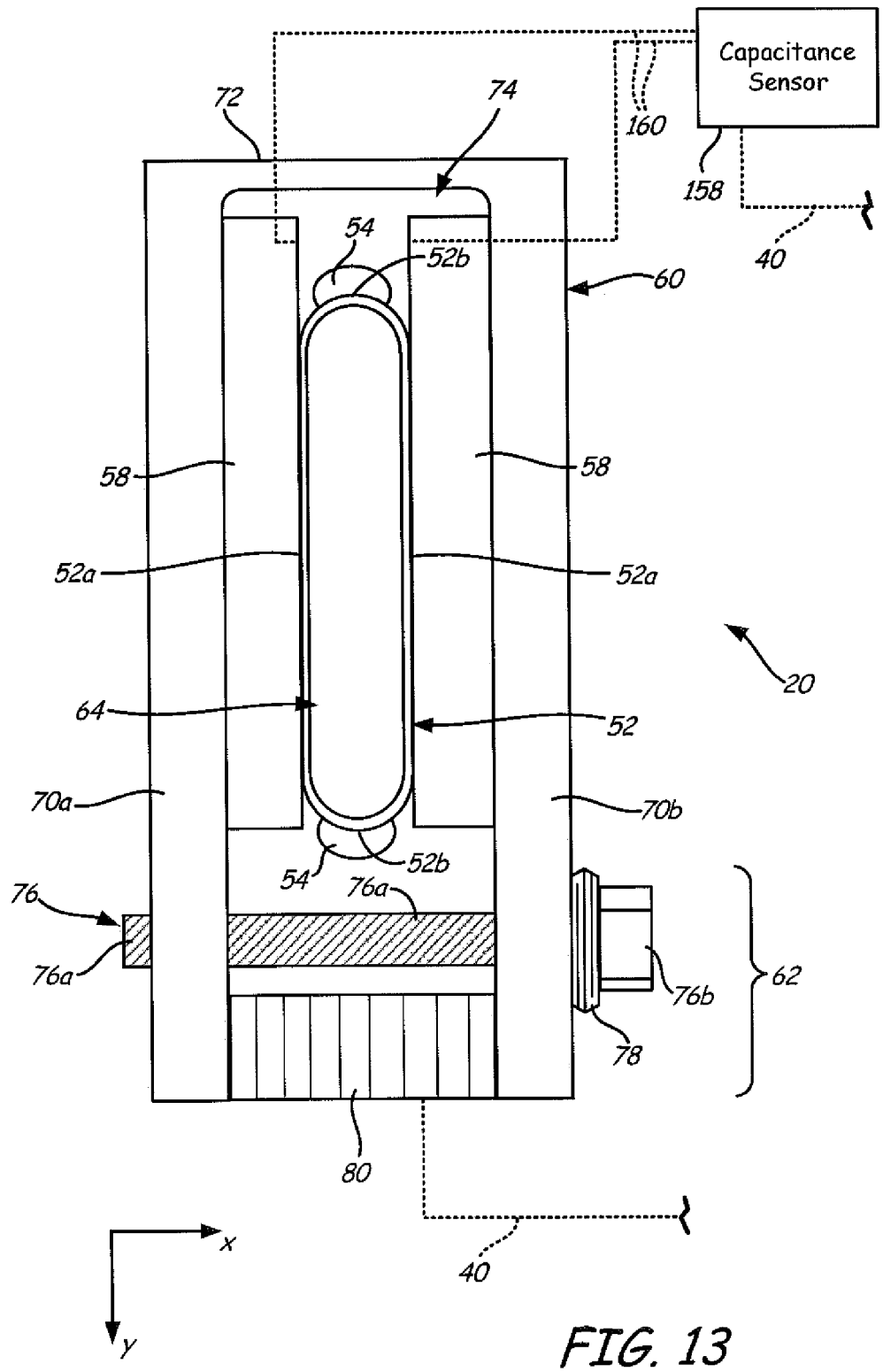
FIG. 13 is a top view of a sixth alternative liquefier assembly, which includes a capacitance sensor for measuring compressions and expansions on the liquefier assembly.

Alternatively, as shown in FIG. 13, liquefier assembly 20 may be connected to capacitance sensor 158, which may be connected to controller assembly 38 or any other suitable computer-based system. Capacitance sensor 158 is configured to generate an electrical field across channel 74 between spacers 58, such as with one or more electrical lines 160, for measuring the capacitance of the generated electrical field. In particular, capacitance sensor 158 is configured to measure changes in the generated electrical field as liquefier 52 is transversely compressed and released. This arrangement allows precise time-dependent, compression distances to be accurately measured, providing real-time feedback for the surges and draw backs generated by piezoelectric actuator 80.

This can also be used for a variety of purposes, such as to characterize the consumable material, for read-time feedback control during printing operations (e.g., for feedback loops to controller assembly 38), and/or for purposes of calibrating piezoelectric actuator 80 with the compression levels applied to liquefier 52. In some embodiments, the combination of piezoelectric actuator 80 and capacitance sensor 158 may also be used by controller assembly 38 to measure compressibility in liquefier 52. In this case, if filament 48 is wet and releasing steam when melted in liquefier 52, the resulting gas pockets that are formed will have higher compressibilities than the molten material. As such, when this occurs, liquefier 52 will transversely compress further than expected by capacitance sensor 158, which can indicate an error condition. Controller assembly 38 may then stop operation of system 10, provide an warning indication of the error condition, and/or perform a purge operation.

Figure 14:
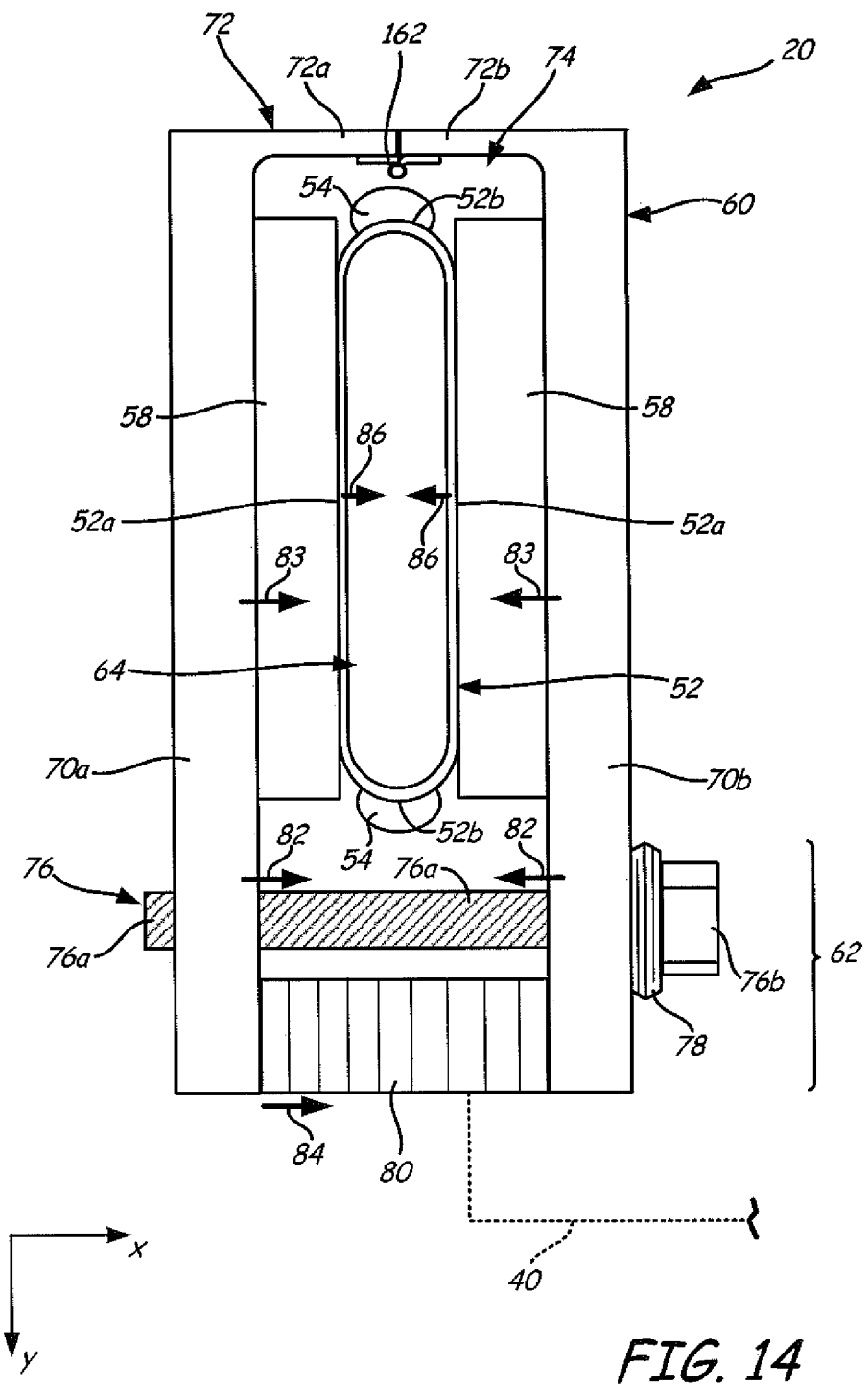
FIG. 14 is a top view of a seventh alternative liquefier assembly, which includes a hinged frame for accommodating compressions and expansions on the liquefier assembly.

FIG. 14 illustrates yet another alternative embodiment for liquefier assembly 20. In this embodiment, base portion 72 of clam frame 60 is separated into base sub-portions 72*a* and 72*b*, each of which is operably connected by one or more hinge mechanisms 162. Hinge mechanism(s) 162 pivotably connect base sub-portions 72*a* and 72*b*, and allow flanges 70*a* and 70*b* to flex without risk of damaging base portion 72, and with less transversely-directed biasing resistance. This reduces the pulling and pushing pressure required by piezoelectric actuator 80 to compress and expand liquefier 72. This hinged-connection arrangement with hinge mechanism(s) 162 (or any other suitable hinge mechanism) may be incorporated into any of the embodiments discussed herein, as desired.

Figure 15:
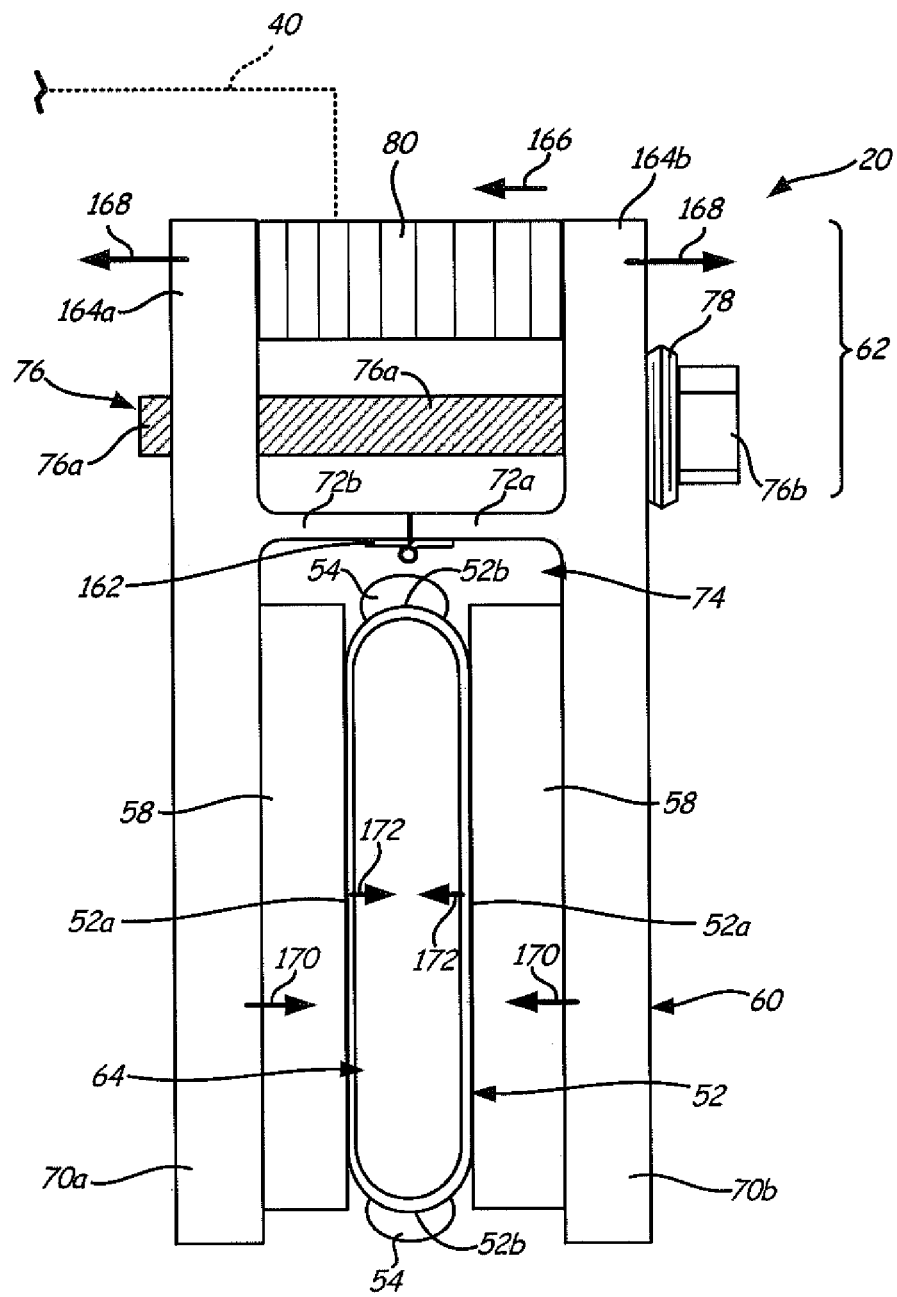
FIG. 15 is a top view of an eighth alternative liquefier assembly, which includes a hinged frame and opposing flanges for retaining the actuator mechanism.

As shown in FIG. 15, clam frame 60 may also extend to the opposing side of base portion 72 to retain actuator mechanism 62 with flanges 164*a* and 164*b*. This embodiment is beneficial for further thermally isolating piezoelectric actuator 80 from liquefier 52 and heater assemblies 54. During operation, controller assembly 38 operates piezoelectric actuator 80 in an opposite manner from that discussed above for the example shown in FIGS. 2-6. In particular, when controller assembly 38 commands piezoelectric actuator 80 to extend, as depicted by arrow 166, flanges 164*a* and 164*b* are pressed apart, as depicted by arrows 168. This accordingly, pivots base sub-portions 72*a* and 72*b* (or base portion 72) around hinge mechanism 162 to pull the opposing ends of flanges 70*a* and 70*b* together at liquefier 52, as depicted by arrows 170, which accordingly compresses liquefier 52 transversely, as depicted by arrows 172.

Oppositely, when controller assembly 38 commands piezoelectric actuator 80 to contract, flanges 164*a* and 164*b* are pulled together, which pulls flanges 70*a* and 70*b* apart. This accordingly releases the transverse pressure applied to liquefier 52. As such, controller assembly 38 effectively inverts the longitudinal contraction and extension signals relayed to piezoelectric actuator 80, compared to the example shown in FIGS. 2-6, in the same manner as discussed above for the reverse-clamp arrangement shown in FIG. 9.

Figure 16:
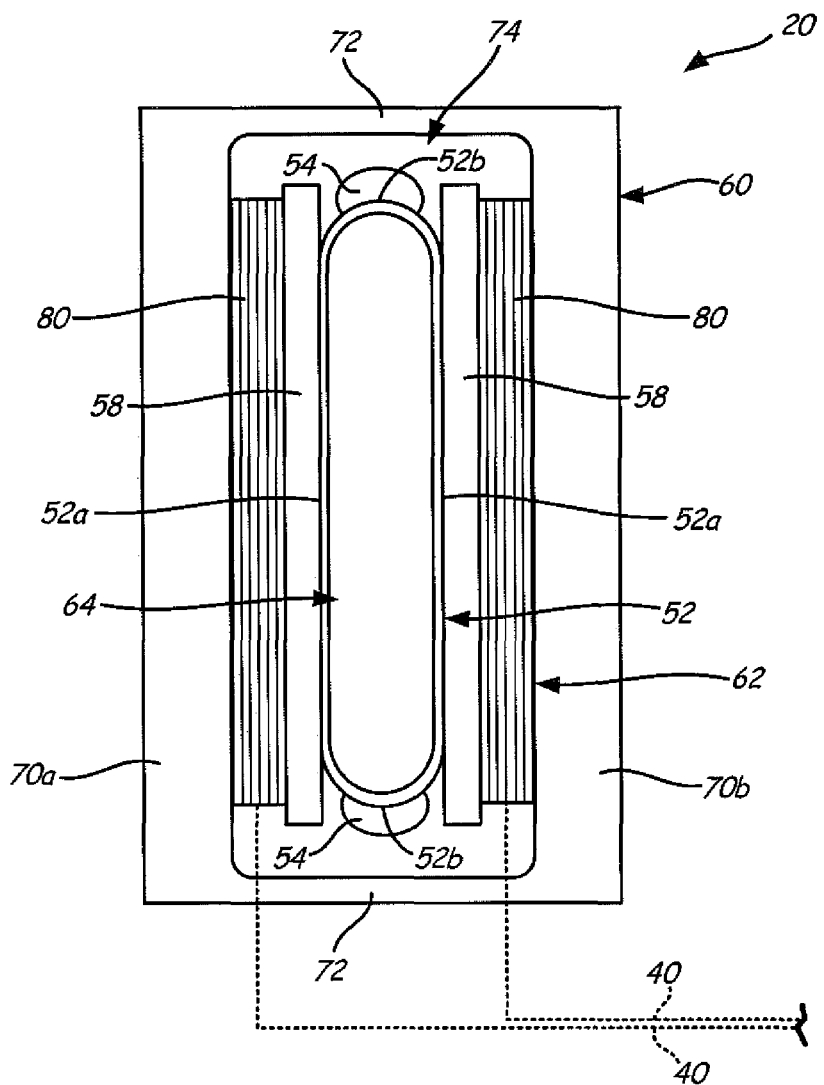
FIG. 16 is a top view of a ninth alternative liquefier assembly, which includes a pair of opposing actuators.

FIG. 16 illustrates an embodiment that includes two (or more) opposing piezoelectric actuators 80 disposed between spacers 58 and flanges 70*a* and 70*b*. In this embodiment, flanges 70*a* and 70*b* preferably do not flex since the transverse pressures are applied directly to liquefier 52. As such, tension bolt 76 and biasing spring 78 may optionally be omitted, and clam frame 60 may be replaced with enclosed rectangular frame 60 having opposing base ends 72.

Due to the close proximity of piezoelectric actuators 80 to liquefier 52, spacers 58 preferably thermally isolate piezoelectric actuators 80 from liquefier 52 (and heater assemblies 54) to protect piezoelectric actuators 80 from exposure to excessive heat. In some aspects, spacers 58 and/or frame 60 may be connected to one or more heat sinks to draw heat away from liquefier 52, thereby reducing the amount of heat that transfers to piezoelectric actuators 80.

During operation, controller assembly 38 may command piezoelectric actuators 80 in a synchronized manner such that piezoelectric actuators 80 both extend to apply compressive pressure on liquefier 52 (for generating a surge of the molten material), or both contract to release the transversely-applied pressure from liquefier 52 (for generating a drawback of the molten material).

Controller assembly 38 may also command the piezoelectric actuators 80 in a variety of different manners, such for providing high-precision movements of nozzle 56 along the x-axis. In this case, controller assembly 38 may command one of piezoelectric actuators 80 to extend, and command the other piezoelectric actuator 80 to contract. This moves liquefier 52 and nozzle 56 relative to frame 60 along the x-axis. This can supplement any fine-coarse positioning of nozzle 56.

FIG. 17 illustrates a preferred embodiment that is similar to that shown in FIG. 16, where the enclosed rectangular frame 60 is replaced with enclosed cylindrical frame 60. Cylindrical frame 60 is a rigid member with a circular or elliptical cross section such that the opposing flanges 70*a* and 70*b* and the opposing base ends 72 merge into each other. Accordingly, flanges 70*a* and 70*b* may function in a similar manner to those for the embodiment shown in FIG.

16, and preferably do not flex since the transverse pressures are applied directly to liquefier 52. Frame 60 in this embodiment is beneficial, as its cylindrical geometry further resists inward and outward flexing compared to the rectangular embodiment shown in FIG. 16. This allows the transversely-applied pressures to be directed almost entirely to liquefier 52.

As further shown, liquefier 52, spacers 58, and piezoelectric actuators 80 may be secured within cylindrical frame 60 with additional spacers 174. Spacers 174 are preferably rigid components that are relatively incompressible (e.g., stainless steel, aluminum, or high-strength plastics). In some aspects, spacers 58, spacers 174, and/or frame 60 may be connected to one or more heat sinks to draw heat away from liquefier 52, thereby reducing the amount of heat that transfers to piezoelectric actuators 80.

Controller assembly 38 may operate liquefier assembly 20 as shown in FIG. 17 in the same manner as the embodiment shown in FIG. 16, such as for compressing and releasing liquefier 52. Furthermore, the cylindrical geometry of cylindrical frame 60 is convenient for securely retaining liquefier 52 and piezoelectric actuators 80, as well as for providing a compact design that reduces the overall dimensions of liquefier assembly 20.

Figure 18:
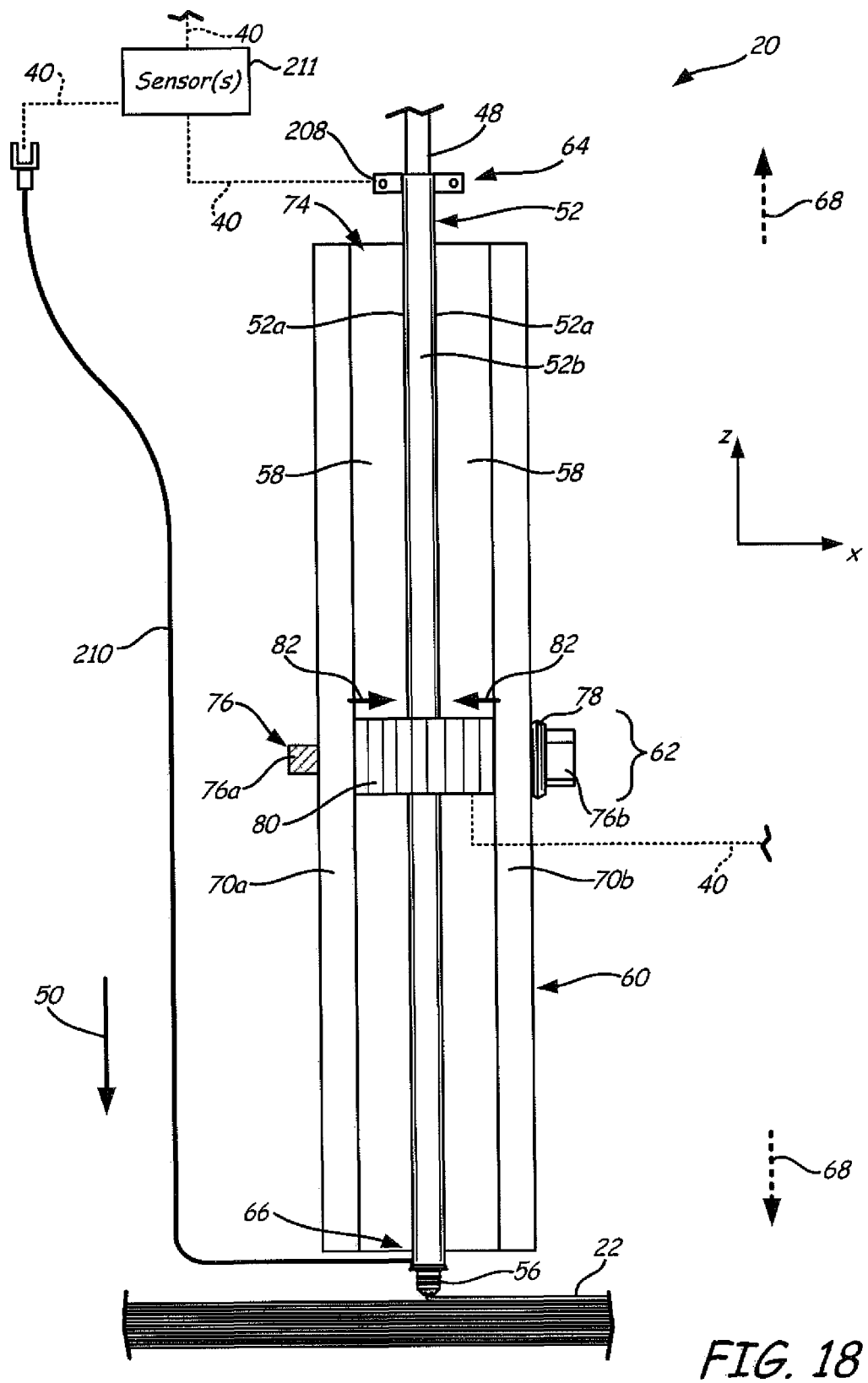
FIG. 18 is a front view of a self-heating liquefier assembly in use during a printing operation to print a 3D part.

FIG. 18 illustrates an alternative liquefier stage 176, which includes a cylindrical liquefier 184 at least partially encased by heater assembly 190, and which is in use with cylindrical filament 48. Cylindrical liquefier 184 in this embodiment may have any suitable dimensions for melting the cylindrical filament 48, and for pushing the pressurized molten material to conduit 178, as discussed above.

Examples of suitable lengths for cylindrical liquefier 184 in this embodiment include at least about 1.5 inches, more preferably from about 1.5 inches to about 5 inches, and even more preferably from about 50 millimeters (about 2 inches) to 76 millimeters (about 3.0 inches). Examples of suitable hollow inner diameters for cylindrical liquefier 184 range from about 1.5 millimeters (about 60 mils) to about 2.5 millimeters (about 100 mils), and in some embodiments from about 2 millimeters (about 80 mils) to about 2.4 millimeters (about 95 mils). In other embodiments, the hollow inner diameters range from about 1.5 millimeters (60 mils) to about 2 millimeters (about 80 mils). Examples of suitable wall thickness for cylindrical liquefier 184 range from about 0.25 millimeters (about 10 mils) to about 0.76 millimeters (about 30 mils), and more preferably from about 0.38 millimeters (about 15 mils) to about 0.5 millimeters (about 20 mils).

As can also be appreciated from the above discussion, the coordinated operation of the drive mechanisms 46 and the actuator mechanisms 62 allow controller assembly 38 to print roads of the molten part and support materials with accurate and consistent volumes while moving along a variety of different tool path trajectories that have non-steady-state conditions, such as road starts and stops, corners, and other conditions where the extrudate flow rates may vary.

This can accordingly improve the resolutions and accuracies of the printed 3D parts and support structures (e.g., 3D part 12 and support structure 14). In addition, for many tool path trajectories, controller assembly 38 can substantially maintain the velocities of print head 18 due to the reduced time response delays. This provides the benefit of reducing print times on a per-layer basis, which can result in substantial reductions in production times for printing large 3D parts and support structures.

Additionally, liquefier 52, in any of the above-discussed embodiments, may also receive an applied electrical current (e.g., via line 40) that can generate resistive heating along liquefier 52. Controller assembly 38 may also measure and monitor the temperature of liquefier 52 in real time from the resistance to the applied electrical current (e.g., via line 40). This effectively provides a self-heating and/or self-sensing liquefier, which is particularly beneficial with the transversely-compressible nature of liquefier 52 since it can optionally eliminate the need for heater assemblies 54 located at faces 52a, and can also reduce component costs. Moreover, this design may also reduce moving mass, which can reduce gantry costs and increase agility, and may also reduce thermal mass, which can reduce drool, increase temperature accuracy, and allow thermal inflation control of the melt flow.

For example, as shown in FIG. 18, liquefier assembly 20 may also include top electrode 208 clamped or otherwise retained at inlet end 64 of liquefier 52 and may function as an electrical contact and mechanical ground. Liquefier assembly 20 also includes electrical wire 210, which may be secured (e.g., brazed) to outlet end 66 of liquefier 52 and/or nozzle 56 and functions as a tip-end electrode. The opposing end of electrical wire 210 may terminate in an connector, which may attach to any suitable electrical contact to receive an electrical current (e.g., via line 40).

Electrode 208 and electrical wire 210 may also connect to one or more current sensors (e.g., one or more hall sensors 211), which may be sub-components of controller assembly 36 and/or separate from controller assembly 36. The current or hall sensor(s) 211 may measure and monitor the resistance to the applied electrical current, effectively functioning as a temperature sensor for liquefier 52. This allows controller assembly 36 to adjust the applied electrical current to maintain a desired thermal profile along liquefier 52 using one or more process control loops.

Electrode 208 and electrical wire 194 may electrically and mechanically contact liquefier 52 by welding, brazing, molecular bonding, clamping (e.g., with a carbon or silver interface), and the like. In these embodiments, liquefier 52 may alternatively be fabricated from one or more other materials besides (or in addition to) stainless steel, such as alloys (e.g., nickel, molybdenum, Nichrome, bulk-metallic glasses, and the like), semiconductors (e.g., silicon), positive- and/or negative-temperature-coefficient ceramics (barium titanate), and the like.

Figure 19:
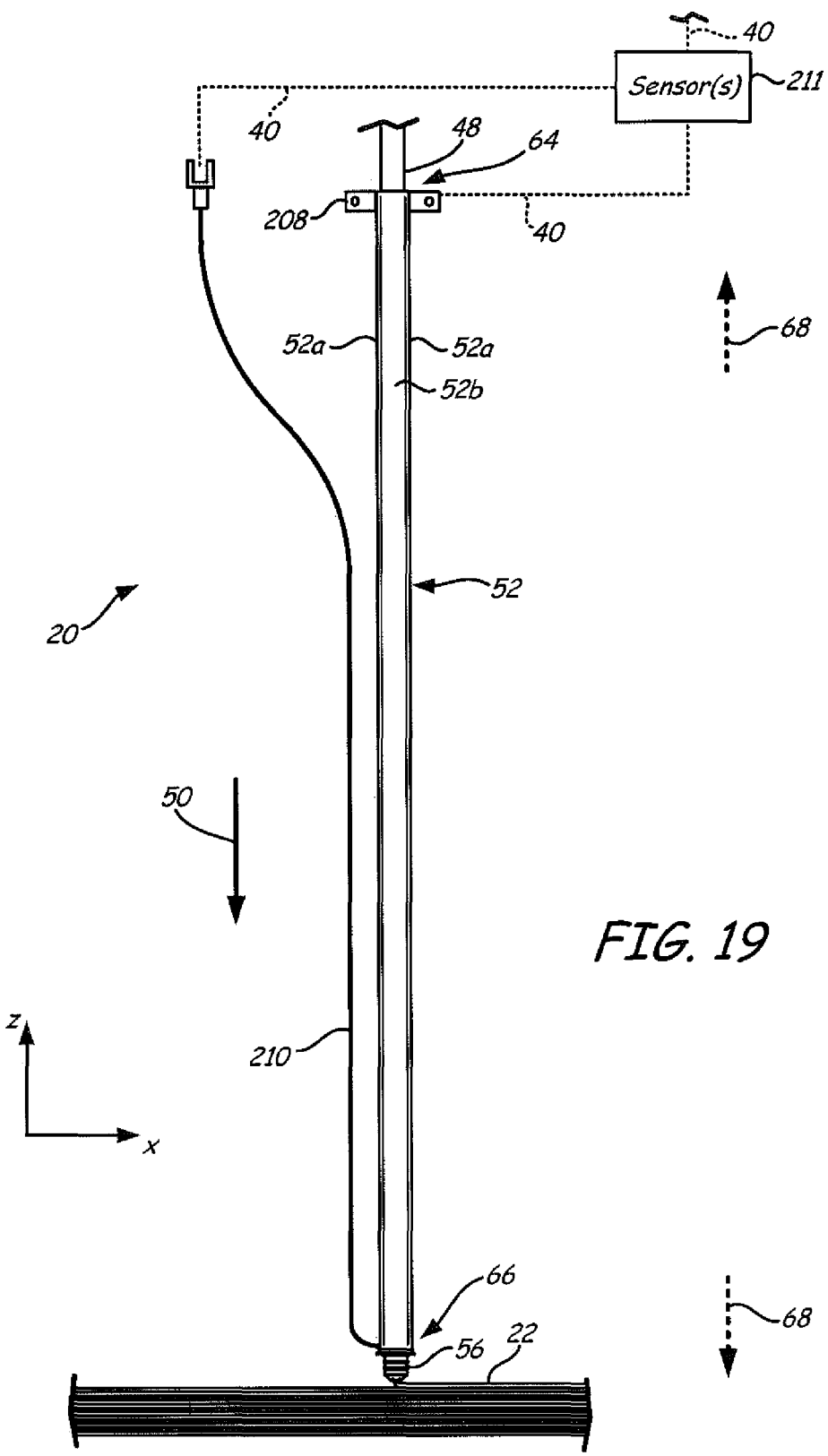
FIG. 19 is a front view of an alternative self-heating liquefier assembly in use during a printing operation to print a 3D part, which may optionally be a stand-alone liquefier without an actuator mechanism.
Figure 20:
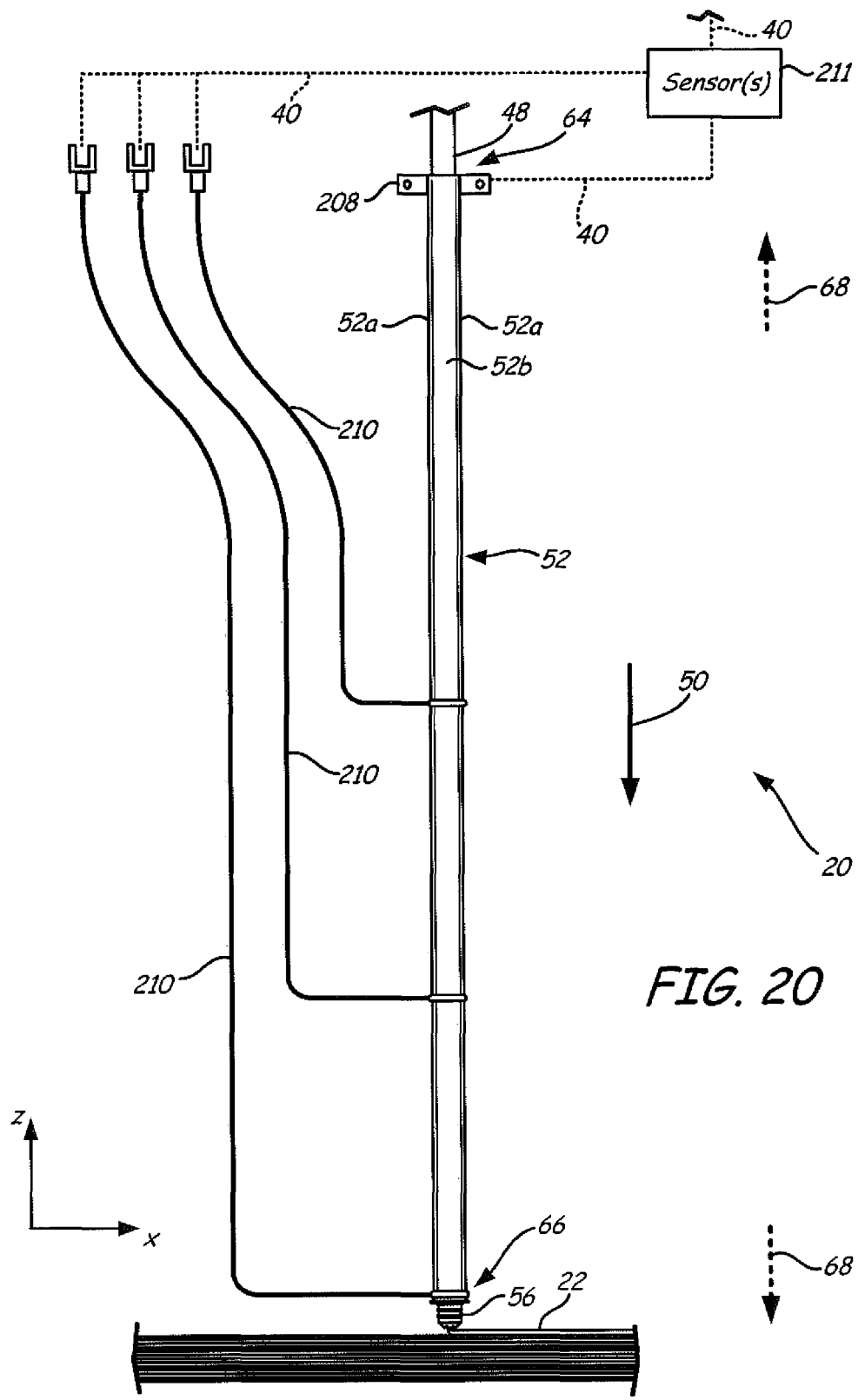
FIG. 20 is a front view of another alternative self-heating liquefier assembly in use during a printing operation to print a 3D part, which includes multiple heating zones.

Additionally, as mentioned above, this self-heating feature of the present disclosure may also be used with any suitable liquefier (cylindrical and/or non-cylindrical), such as those shown in FIGS. 19 and 20. In these embodiments, liquefier assembly 20 does not necessarily include any actuator mechanism (e.g., actuator mechanism 62), and may be retrofitted as a liquefier assembly into an existing additive manufacturing system.

In this case, examples of suitable liquefiers that may benefit from this self-heating (and/or self-sensing) feature include those disclosed in Batchelder et al., U.S. Pat. Nos. 7,897,074; 8,221,669; 8,236,227; and 8,439,665; Swanson et al., U.S. Pat. Nos. 6,004,124; 8,647,098; and 8,647,102; Rodgers et al., U.S. Publication No. 2013/0241102; Swanson et al., U.S. Publication No. 2014/0048969; and Leavitt, U.S. Publication No. 2014/0159284, the disclosures of each of which are incorporated by reference to the extent that they do not conflict with the present disclosure. Accordingly, liquefier 52 of this embodiment may have hollow cylindrical geometry, a hollow ribbon geometry, or any other suitable hollow geometry.

As shown in FIG. 19, liquefier assembly 20 in this example may also include top electrode 208 clamped or otherwise retained at inlet end 64 of liquefier 52, and may function as an electrical contact and mechanical ground. Liquefier assembly 20 also includes electrical wire 210, which may be secured (e.g., brazed) to outlet end 66 of liquefier 52 and/or nozzle 56 and functions as a tip-end electrode. The opposing end of electrical wire 194 may terminate in an electrical connector, which may attach to any suitable electrical contact to receive an electrical current (e.g., via line 40).

In the configurations shown in FIGS. 18 and 19, controller assembly 36 may apply an electrical current through electrical wire 210, such as an applied direct-current having "on" and "off" states. When on, the applied voltage divided by the current draw provides the resistance of the circuit, which rises as the temperature of liquefier 52 rises. The uncontrolled resistance of the circuit (primarily the contacts) may optionally be measured at room-temperature start-up. Thereafter, the change in resistance/temperature coefficient can provide the temperature rise (and/or a look-up table can optionally be used), such as with hall sensor(s) 211.

Because a single electrical wire 210 is used in this embodiment (i.e., a single heating-zone design), the measured temperature is the average temperature for liquefier 52. During a steady state flow, the location along liquefier 52 with the highest temperature will typically reside about one-third of the distance (along liquefier 52) from nozzle 56. This is because, during use, nozzle 56 is being cooled by 3D part 22 and by air, and inlet end 64 may be cooled by incoming inlet air and by the melting of filament 48.

If a long life at high operating temperatures is desired, the current drive preferably changes sign, so that the average current applied to liquefier 52 is zero. This is preferably performed to minimize defect electromigration, and can be accomplished with H-bridges, transformer coupling, or other drive techniques.

FIG. 20 illustrates alternative embodiment to those shown in FIGS. 18 and 19, which may include multiple-zone self heating with multiple electrical wires 210 connected to liquefier 52 at any suitable locations. In this embodiment, liquefier assembly 20 may include from two to ten electrical wires 210 (for up to ten heating zones), from two to eight electrical wires 210 (for up to eight heating zones), from two to six electrical wires 210 (for up to six heating zones), from two to four electrical wires 210 (for up to four heating zones), from two to three electrical wires 210 (for up to three heating zones), and/or two electrical wires 210 (for two heating zones).

Figure 21:
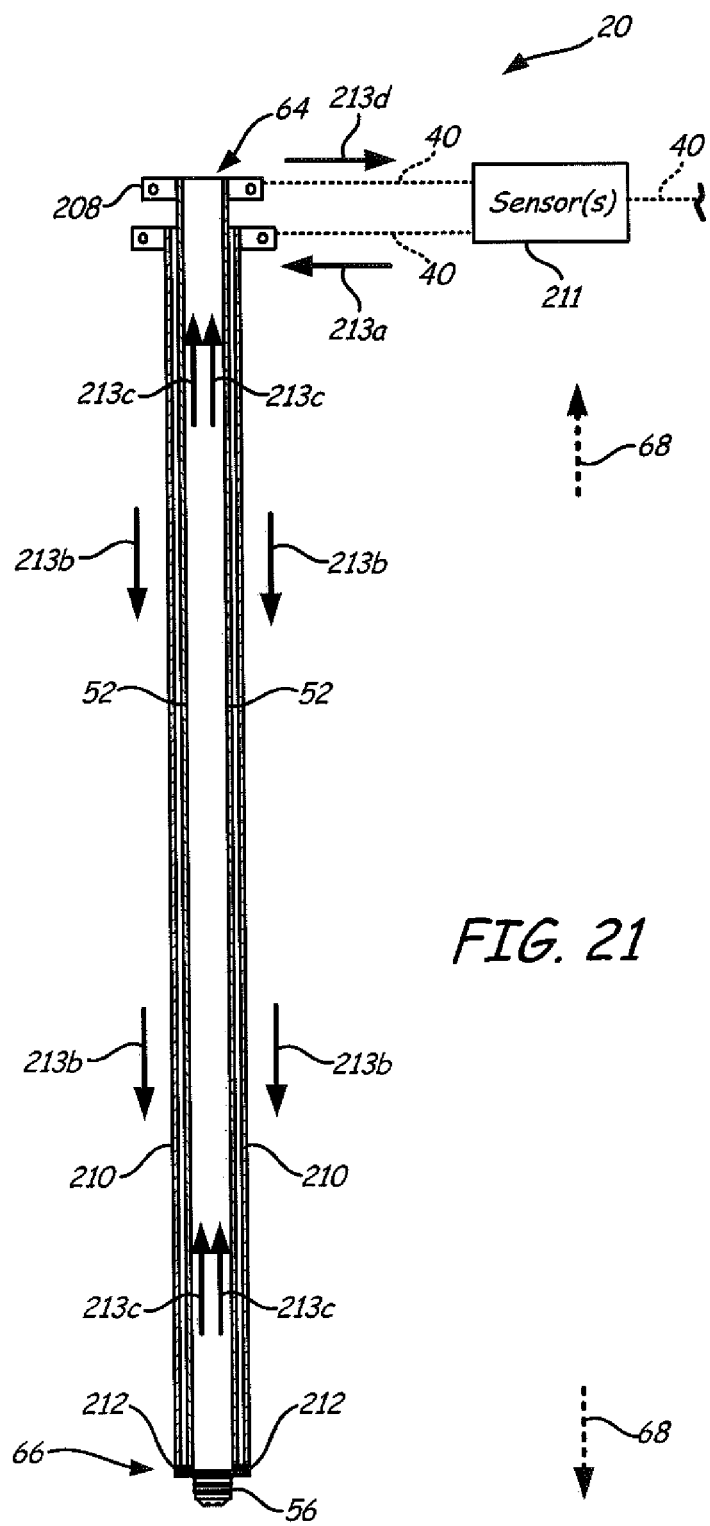
FIG. 21 is a front sectional view of another alternative self-heating liquefier assembly, which includes a constrained electrical line.

As shown in FIG. 21, in some embodiments, electrical wire(s) 210 may be replaced with outer tubing 210 that may extend around liquefier 52, such as coaxially around liquefier 52, where the term "coaxially" is not intended to be limited to cylindrical liquefier embodiments, and may include ribbon and/or other non-cylindrical liquefiers 52. The use of outer tubing 210 may be fabricated from one or more electrically conductive materials, is beneficial for constraining the electrical connections away from nozzle 56. In this case, outlet end 66 of liquefier 52 and outer tubing 210 may be connected to nozzle 56, such as with one or more brazed connections 212.

This creates an electrical pathway though outer tubing 210, brazed connection(s) 212, and liquefier 52. Outer tubing 210 and liquefier 52 may be separated by one or more electrically isolating materials, such as an insulating oxide and/or air. As such, the electrical current may enter (shown by arrows 213a) and flow down through outer tubing 210 (shown by arrows 213b), through the brazed connection(s) 212, back up through liquefier 52 (shown by arrows 213c), and out from electrode 208 (shown by arrows 213d). This has the advantage that the effective resistivity of the liquefier 52 can be multiplied by four, which can significantly reduce the peak current required, and can radiate significantly less. Alternatively, the electrical current may be passed in the opposing direction of arrows 213a-213d. In further alternatives, outer tubing 210 may also be encased or otherwise enshrouded with one or more electrically and/or thermally insulating layers.

EXAMPLES

The present disclosure is more particularly described in the following examples that are intended as illustrations only, since numerous modifications and variations within the scope of the present disclosure will be apparent to those skilled in the art.

I. Example 1

A liquefier assembly according to the embodiment shown in FIGS. 2-5 was assembled to compare the response times of a filament drive mechanism and transversely-applied and released pressures on a ribbon liquefier. The ribbon liquefier had a width of 6.85 millimeters (0.27 inches), a thickness of 0.991 millimeters (0.039 inches), a wall thickness of 0.076 millimeters (0.003 inches), and a heated length of 35.6 millimeters (1.4 inches). The liquefier assembly did not include an actuator mechanism corresponding to actuator mechanism 62. Instead, one of the flanges of the clam frame was secured to a rigid mount to prevent the liquefier assembly from moving, and a lever was secured to the other flange.

Figure 22:
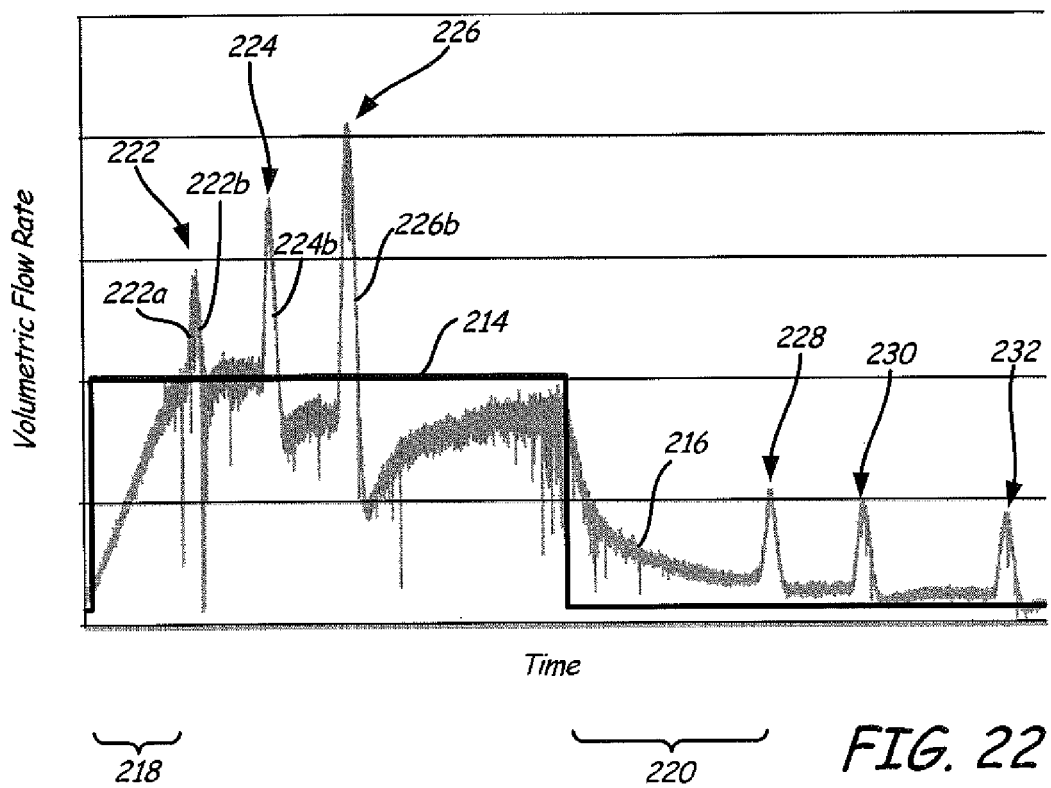
FIG. 22 is a graph of extrudate volumetric flow rate versus time for an example test, illustrating fast response times achievable with transversely-applied compressions and releases on a ribbon liquefier.

During the test, the flow rate of the extrudate was measured using a velocimetry sensor as disclosed in Batchelder, U.S. patent application Ser. No. 13/840,538, which was compared to the signal commands to the filament drive mechanism. FIG. 22 is a plot of volumetric flow rate of the extrudate versus time. The step plot 214 shows the signal commands to motor of the filament drive mechanism, and the plot 216 shows the volumetric flow rate of the extrudate in response to the input changes.

As can be seen, when the filament drive mechanism started feeding the filament into the ribbon liquefier at step 218, the extrudate flow rate exhibited a time response delay to reach the desired flow rate, as indicated by the sloped increasing flow rate at step 218. Similarly, when the filament drive mechanism was commanded to stop feeding the filament into the ribbon liquefier at step 220, the extrudate flow rate exhibited a time response delay (with an exponential decay) to stop extruding, as indicated by the sloped decreasing flow rate at step 220.

In comparison, as shown at peak 222, when a user pressed and released the lever to compress the ribbon liquefier (increasing slope 222a) and to release the ribbon liquefier (decreasing slope 222b), the extrudate flow rate quickly increased as a short surge having a very fast response time. This press and release was performed several additional times as illustrated by peaks 224 and 226, where negative pressures were also applied during the release steps to generate suck backs of the extrudate, as illustrated by the reduced flow rates at the decreasing slopes 224b and 226b.

Similar press and release tests were also performed after the filament drive mechanism was commanded to stop, as illustrated by peaks 228, 230, and 232. These peaks 228, 230, and 232 also exhibited very fast response times due to the compressions and expansions of the ribbon liquefier. These time response of extrudates produced by the compressions and expansions of the ribbon liquefier (peaks 222-232) were significantly faster than those achievable with the filament drive mechanism (steps 218 and 220).

II. Example 2

Figure 23:
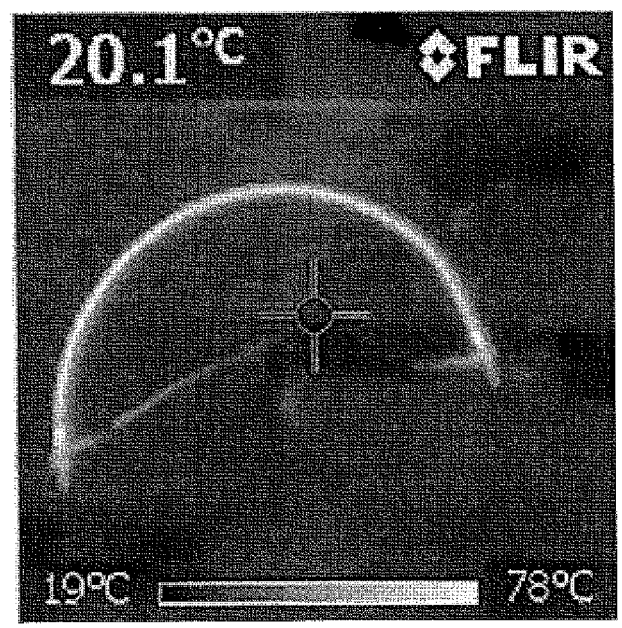
FIG. 23 is an infrared photograph of an example self-heating conduit test.

A test was also performed to determine whether a conduit (e.g., corresponding to conduit 178) is capable of self heating under an applied electrical current. FIG. 30 is an infrared image of the test conduit being electrically heated. The conduit was a 14-gauge 304-stainless steel tubing, 12-inches long, with an 84 mil outer diameter, and 10 mil wall thickness. 12-gauge copper wires (3-feet in length) connected the conduit to a 10-ampere power supply, which required about 1.9 Volts of drive. The copper wires were brazed to the conduit with Muggy Weld SSF-6 silver solder using a propane torch. As shown in FIG. 23, pushing 10 amperes through the conduit raised the temperature of the conduit to about 90° C. in ambient air. This illustrates that the conduits, liquefiers, and accumulators of the present disclosure are capable of self heating under applied electrical currents.

Although the present disclosure has been described with reference to preferred embodiments, workers skilled in the art will recognize that changes may be made in form and detail without departing from the spirit and scope of the disclosure. Applicant hereby incorporates by reference U.S. Provisional Patent Application Ser. No. 62/056,200 entitled PRINT ASSEMBLY FOR ADDITIVE MANUFACTURING SYSTEM, AND METHODS OF USE THEREOF filed on Sep. 26, 2014 in its entirety.

The invention claimed is:

1. A liquefier assembly for use in an additive manufacturing system to print three-dimensional parts by material extrusion, the liquefier assembly comprising:

a ribbon liquefier having opposing faces corresponding to a width of the ribbon liquefier and opposing lateral ends corresponding to a thickness of the ribbon liquefier, and having an inlet end configured to receive a ribbon filament, an outlet end offset along the longitudinal axis thereof, and a heating zone therebetween, wherein the width is at least about 2.5 times greater than the thickness, and wherein the ribbon liquefier is transversely compressible;

a heater positioned about the ribbon liquefier along the heating zone, wherein the heater is configured to impart thermal energy into the ribbon filament to create a molten pool within the heating zone of the ribbon liquefier;

a nozzle at the outlet end of the ribbon liquefier configured for extruding the ribbon filament in a continuous flow caused by forcing the ribbon filament into the molten pool;

spaced apart flanges positioned along opposing faces of the ribbon liquefier and extended along the longitudinal axis thereof; and an actuator mechanism operably positioned proximate the ribbon liquefier and configured to controllably apply pressure by moving at least one of the spaced apart flanges such that the spaced apart flanges move relative to each other act on the opposing faces to transversely compress and release the ribbon liquefier, wherein the compression of the ribbon liquefier decreases a volume within the ribbon liquefier which increases volumetric flow rate of an extrudate and the release of pressure on the ribbon liquefier tube causes expansion of the volume the ribbon liquefier and a decrease in volumetric flow rate of the extrudate.

2. The liquefier assembly of claim 1, wherein the lateral ends are rounded.

3. The liquefier assembly of claim 1, and further comprising one or more electrical lines configured to operably connect the actuator mechanism to a controller assembly of the additive manufacturing system.

4. The liquefier assembly of claim 1, wherein the actuator mechanism comprises one or more piezoelectric actuators.

5. The liquefier assembly of claim 1, wherein the heater comprises one or more heater assemblies sandwiched between the flanges and the ribbon liquefier.

6. The liquefier assembly of claim 1, and further comprising one or more sensors configured to measure compressions and expansions of the ribbon liquefier.

7. The liquefier assembly of claim 1 and further comprising at least one electrode attached to the ribbon liquefier wherein the at least one electrode is configured to connect to an electric source such that current heats the ribbon liquefier.

\* \* \* \* \*